(12) United States Patent
Khan

(10) Patent No.: US 7,042,449 B2
(45) Date of Patent: May 9, 2006

(54) PUSH-TUMBLE THREE DIMENSIONAL NAVIGATION SYSTEM

(75) Inventor: Azam Khan, Aurora (CA)

(73) Assignee: Autodesk Canada Co., San Rafael, CA (US)

( * ) Notice: Subject to any disclaimer, the term of this patent is extended or adjusted under 35 U.S.C. 154(b) by 120 days.

(21) Appl. No.: 10/183,432

(22) Filed: Jun. 28, 2002

(65) Prior Publication Data

US 2004/0001110 A1 Jan. 1, 2004

(51) Int. Cl.
*G06T 17/00* (2006.01)
(52) U.S. Cl. .................. 345/420; 345/427; 345/619; 345/629; 345/647; 345/649; 715/848; 715/849; 715/850; 715/858
(58) Field of Classification Search ............... 345/419, 345/427, 629, 757, 420, 619, 647, 649; 348/47; 382/284; 715/848, 849, 850, 858
See application file for complete search history.

(56) References Cited

U.S. PATENT DOCUMENTS

| | | | | |
|---|---|---|---|---|
| 5,276,785 A * | 1/1994 | Mackinlay et al. | ......... | 345/427 |
| 6,028,584 A * | 2/2000 | Chiang et al. | ............... | 345/628 |
| 6,091,422 A * | 7/2000 | Ouaknine et al. | ........... | 345/419 |
| 6,144,375 A * | 11/2000 | Jain et al. | ................. | 715/500.1 |
| 6,204,850 B1 * | 3/2001 | Green | ........................ | 345/850 |
| 6,271,855 B1 * | 8/2001 | Shum et al. | ................. | 345/427 |
| 6,346,938 B1 * | 2/2002 | Chan et al. | .................. | 345/419 |
| 2004/0210852 A1 * | 10/2004 | Balakrishnan et al. | ...... | 715/856 |

OTHER PUBLICATIONS

Zeleznik et al. "Two Pointer Input For 3D Interaction", ACM, 1997, pp. 115-120.*
Khan, Azam et al., "Interaction: HoverCam: interactive 3D navigation for proximal object inspection", Proceedings of the 2005 symposium on Interactive 3D graphics and games, Apr. 2005.

* cited by examiner

*Primary Examiner*—Kimbinh T. Nguyen
(74) *Attorney, Agent, or Firm*—Staas & Halsey LLP

(57) ABSTRACT

The present invention relates to a system of interactive navigation of a tool relative to three-dimensional volumetric data. The tool may be a camera or a brush and the volume data may be points, curves, iso-surfaces, geometric surfaces or combinations thereof. Moreover, the volume data may be explicitly or implicitly created. In the case of a camera and a surface, a surface of the model is viewed from an initial view point with an initial view direction. A two-dimensional vector, as by moving a mouse, is used to translate the initial view point to a next view point in a plane normal to the view direction and intersecting the initial view point. A point of the surface that is closest to the next view point may then be found, and the next direction of the view is set to the direction from the next position of the view point to the closest surface point. The closest point is found by casting rays from the next view point. The next view direction may be set to the direction of the ray corresponding to the point with the smallest distance. The next view point may be further translated toward or away from the closest surface point, along the newly set next view direction, to a location that is a same distance from the surface as the initial view point.

31 Claims, 27 Drawing Sheets

SECOND VIEW 128 VIEW AFTER ZOOMING OUT 126

THIRD VIEW 132 AFTER ROTATING 130

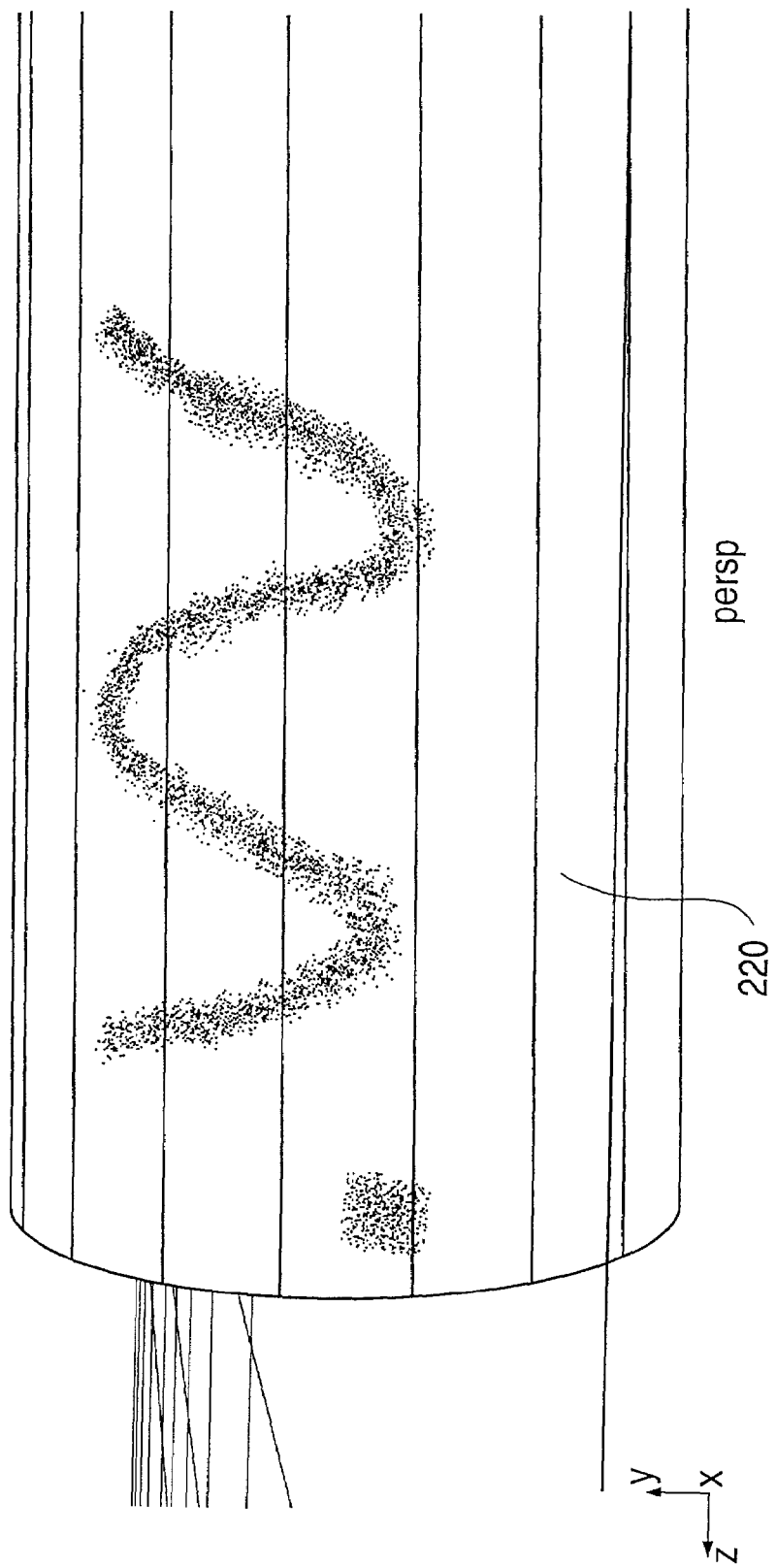

PUSH-TUMBLE THREE DIMENSIONAL NAVIGATION SYSTEM

BACKGROUND OF THE INVENTION

1. Field of the Invention

The present invention is directed to a system for orbital and volumetric navigation that can be used for three-dimensional tasks such as painting and viewing. More particularly, the present invention allows a user to change a viewpoint of an object by essentially pushing and tumbling the object.

2. Description of the Related Art

Three dimensional viewing systems usually include provisions for manipulating a view. Manipulation is generally designed to affect 6 degrees of freedom of a view; 3 for the view direction, and 3 for the view point or position. In the past, two approaches have been used for manipulating a view. First, separate panning, zooming, and tumbling or rotating operations have been assigned to different input controls or modes. Because of the high number of different manipulation actions, and because of the number of viewing parameters affected by those manipulations, it has been difficult to effectively and smoothly manipulate a view. Camera manipulation has generally taken one of two approaches.

A first approach to camera manipulation has been mode-based or multi-control manipulation, where different modes or controls are associated with different operations. For example, a mouse may have extra buttons, and the buttons will switch between different manipulation modes. For example, Button1+drag might control zooming (moving the camera along its camera direction), Button2+drag might control panning (translating the view), and Button3+drag might control tumble or rotation about a single fixed point, often a center or gravity point.

A second approach has been to use complex input devices that can move in three dimensions or otherwise provide greater three-dimensional input data. These devices include, for example, three-dimensional pucks, "space" mice, and other similar devices that are moved in three dimensions. Three-dimensional input devices often require two-handed control, are expensive, require training, or may require resources not available to a typical user with a typical computer workstation. What is needed is a system for manipulating a virtual navigation tool (e.g a camera) or multiple parameters of a virtual tool with a simple input device or input data, without having to toggle between different manipulation controls or modes, and without requiring expensive non-standard input devices.

SUMMARY OF THE INVENTION

It is an aspect of the present invention to provide a system for manipulating parameters of a virtual camera with a simple input device or input data, without the use of different manipulation controls, and without the use of non-standard three-dimensional input devices.

It is an aspect of the present invention to provide a navigation system which can simultaneously control the panning, zooming, and tumbling of a view using only a two-dimensional input device or input data.

It is another aspect of the present invention to provide for simultaneous panning, zooming, and tumbling without switching between corresponding modes.

It is an additional aspect of the present invention to use two-dimensional input data to allow a user to simulate object-centric manipulation of an object or view.

It is also an aspect of the present invention to move a camera or brush about a model while keeping it a consistent distance from the "surface" of the object.

It is a further aspect of the present invention to move a camera or brush about a model while keeping it facing the object and while keeping it a consistent distance from the "surface" of the object.

It is an aspect of the present invention to use a present position of a camera, two-dimensional input data, and a view direction of the camera to determine a new view of the camera.

It is also an aspect of the present invention to use a closest point of a model to a tool, to obtain a normal or model-facing orientation of the tool, or to keep a tool moved by two-dimensional data a constant distance from the model.

It is an aspect of the present invention to provide a navigation system that can be used with web browsers and standard input devices to enable complete manipulation of a model displayed in the web browser, without having to change view-manipulation modes, while maintaining a relatively normal, equidistant, and centered view of the model.

It is another aspect of the present invention to smoothly navigate a camera around edges of a model.

It is another aspect of the present invention to smoothly turn a brush about a model for selection or modification.

It is another aspect of the present invention to smoothly navigate a camera towards a consistent distance from a model when initial conditions are not met or when changing focus between models.

It is another aspect of the present invention to provide a tool that can navigate independently of the underlying model class including surfaces, curves in space, clusters of points, and voxels whether they are explicitly or implicitly created.

The above aspects can be attained by a system that generates or receives a two-dimensional input, automatically pans a view of a model according to the two-dimensional input, automatically zooms the view according to the two-dimensional input, and automatically tumbles or rotates the view according to the two-dimensional input, where the panning, zooming, and tumbling are relative to a fixed point in the space of the model.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 12, 13, 14, 15, 16, and 17 show rendered displays of the cylinder 220, corresponding respectively to the views 222, 224, 226, 228, 230, and 232 shown in FIG. 11.

DETAILED DESCRIPTION OF THE PREFERRED EMBODIMENTS

The present invention is directed to a three-dimensional viewing system. Viewing systems, virtual views, or virtual cameras simulate what a person would see if they were placed within a virtual or three-dimensional space. A viewing system, a view, virtual eye, or virtual camera in part consists of viewing parameters, such as a view point and a viewing direction. A view point establishes the viewer's position within the space being viewed. The view point can be an origin of a coordinate system of the view, or the center of projection together with a view direction. A view direction is usually a vector defining the direction the view is pointed, and is sometimes referred to as the center of view.

Figure 1:
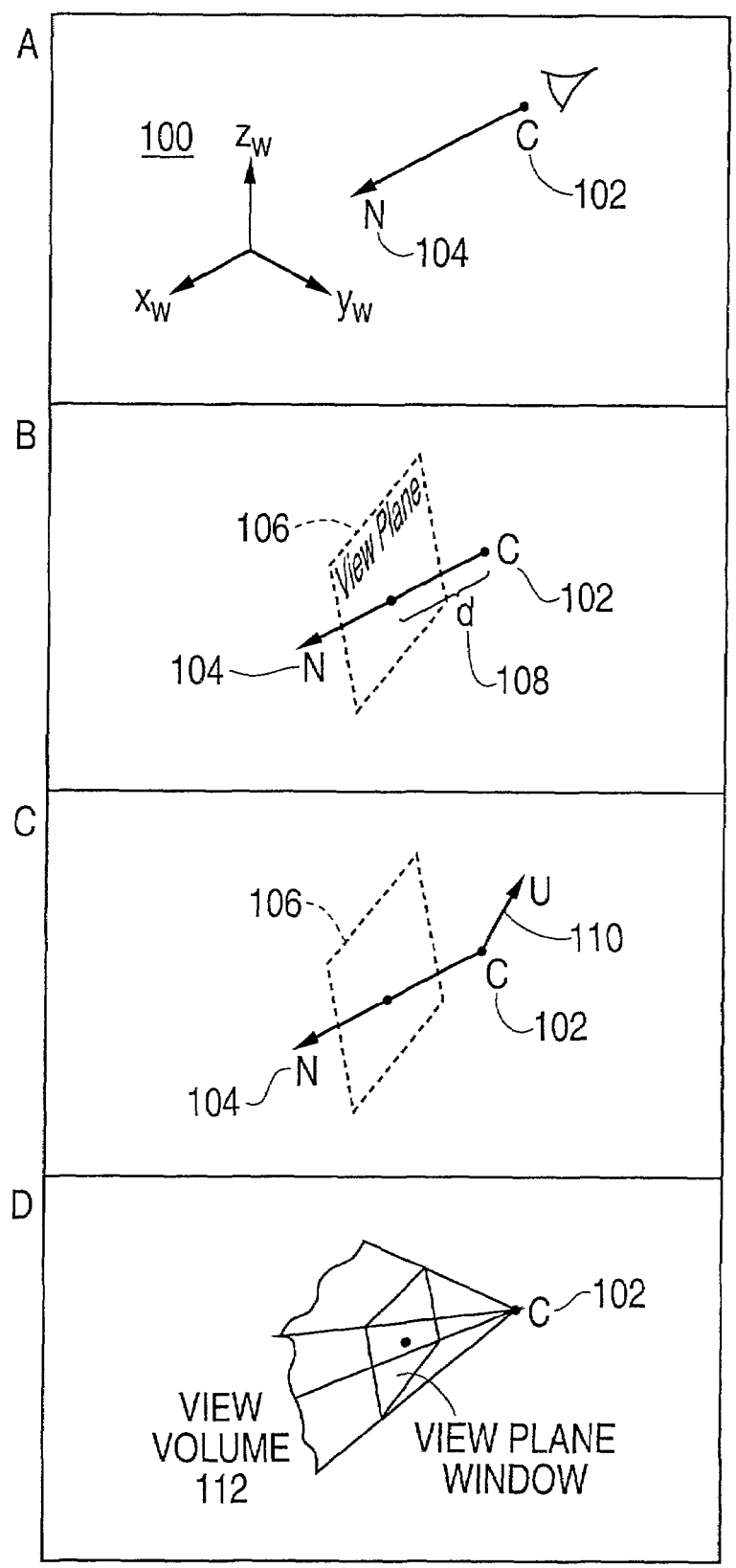
FIG. 1 shows a common system used to describe a virtual view or virtual eye.

FIG. 1 shows principles that are used to describe a virtual view or virtual eye. In area A, a coordinate system 100 is viewed from view point C 102 at viewing direction N 104. In area B, a view plane 106 is normal to the viewing direction N 104, and is positioned distance d 108 from C 102. Area C shows "up" vector U 110, which determines the up direction of the view. Area D shows a view volume 112 defined by the frustum formed by view point C 102 and the view plane window 114. In such a view system, if an unobstructed object or model in the space defined by coordinate system 100 falls within the view volume 112, the viewer will see a two-dimensional representation of it in a display of the view plane window 114, oriented for display according to the "up" vector U 110.

Figure 2:
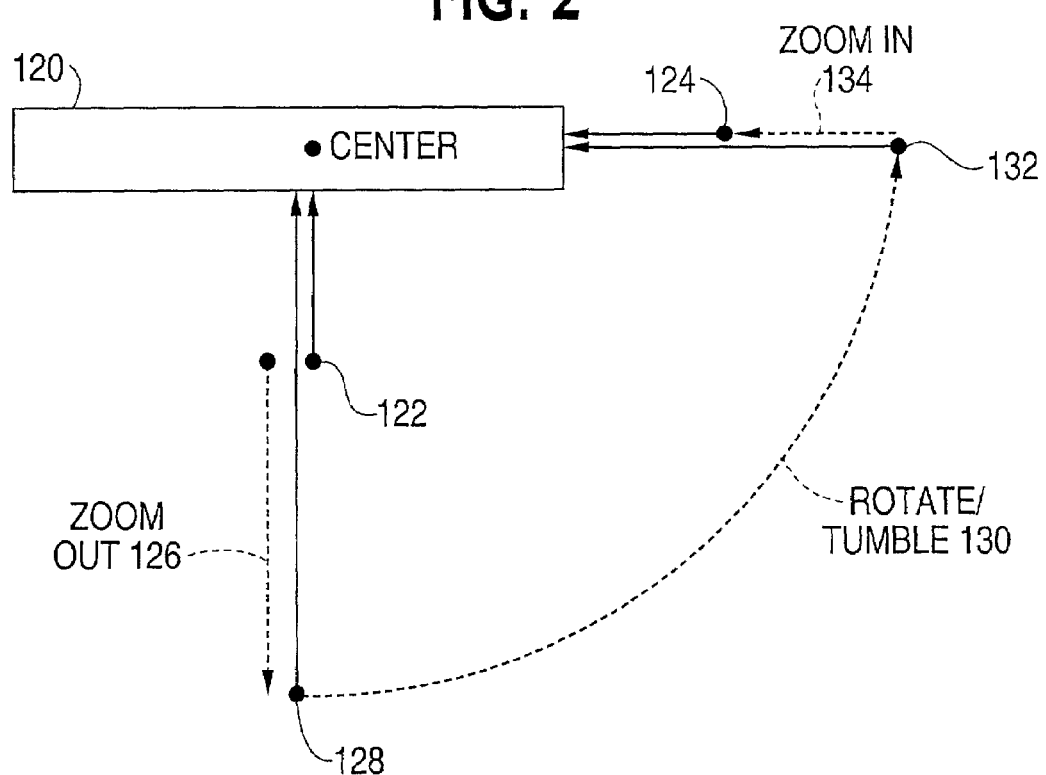
FIG. 2 shows a two-dimensional overhead view of a three-dimensional cylinder model 120.
Figure 3:
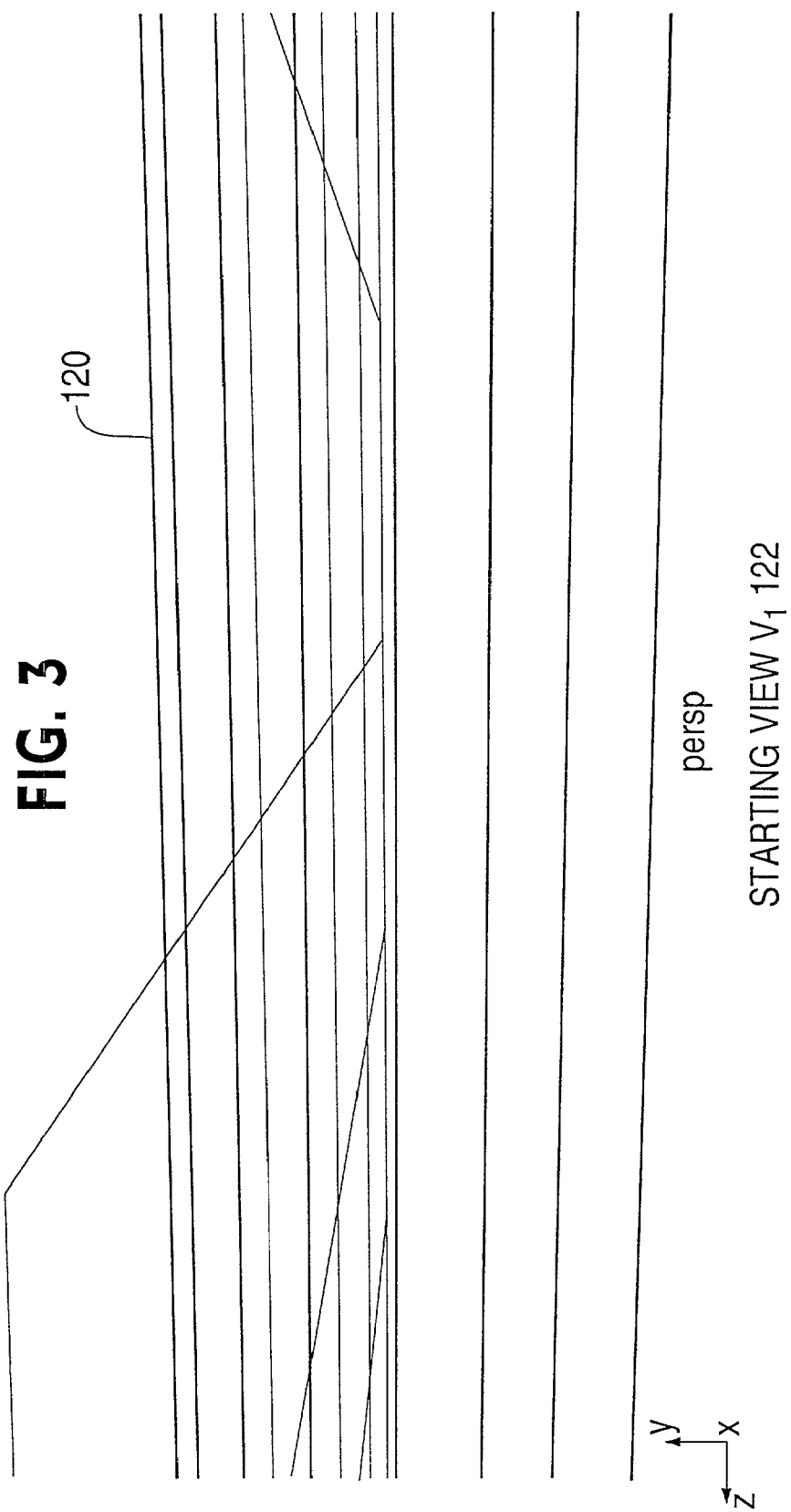
FIGS. 3, 4, 5, and 6 show renderings corresponding respectively to the views 122, 128, 132, 124 in FIG. 2.
Figure 4:
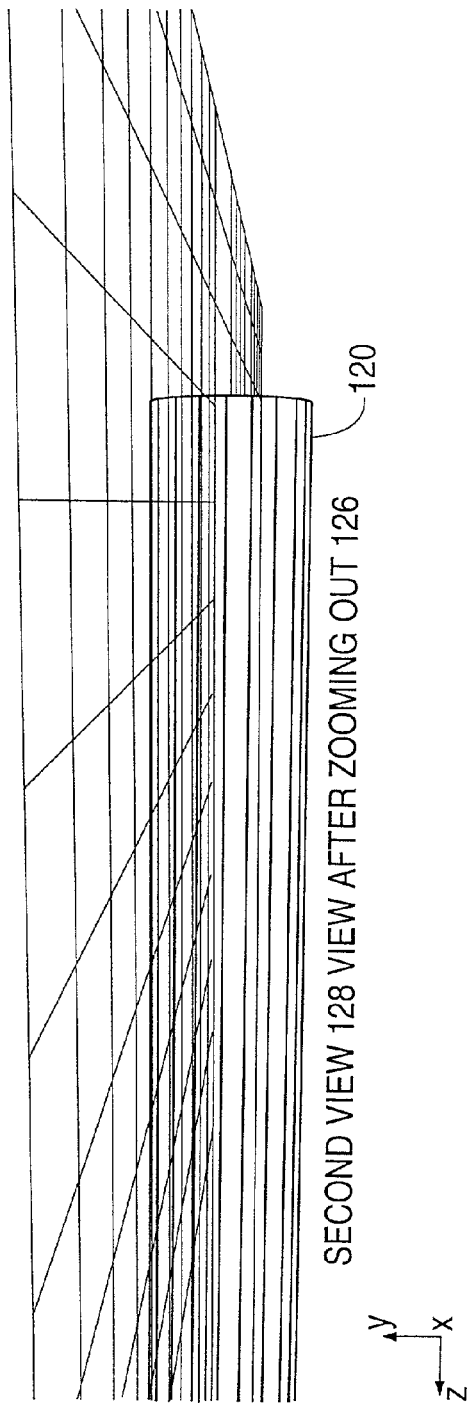
Figure 5:
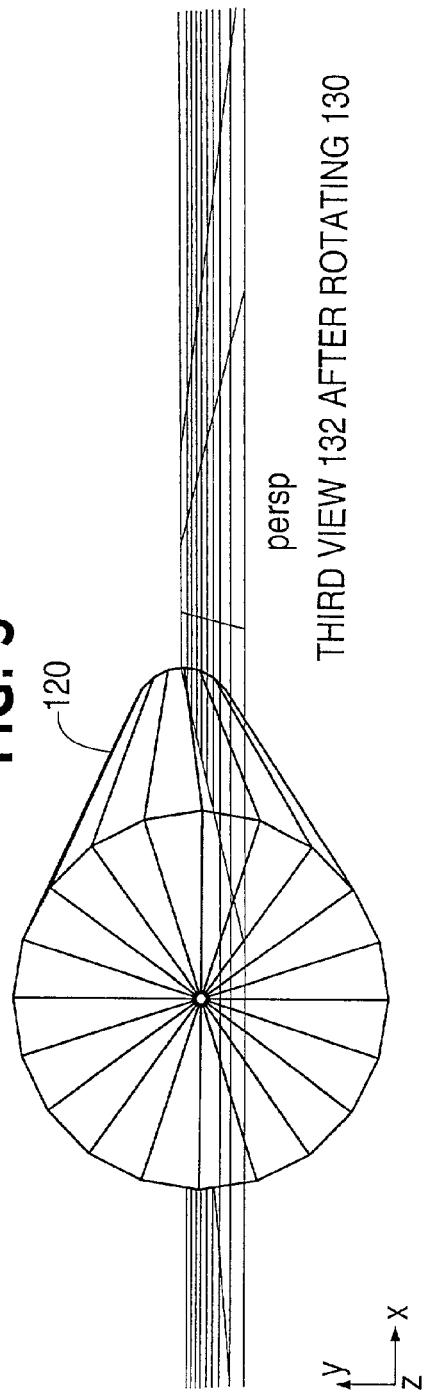
Figure 6:
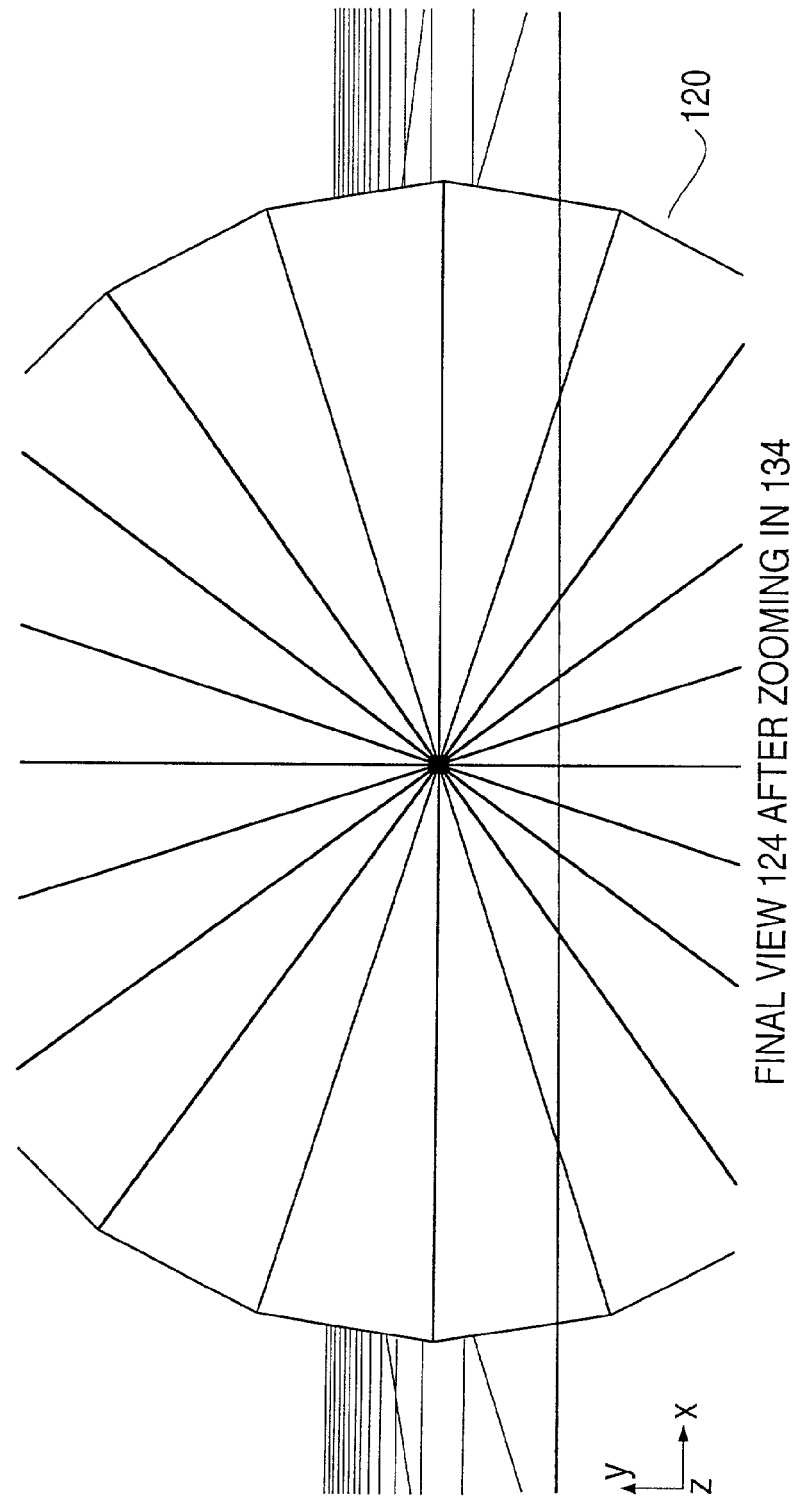

A cylinder is a type of object that can be viewed with a viewing system. FIG. 2 shows a two-dimensional overhead view of a three-dimensional cylinder model 120. FIG. 2 also shows a sequence of views 122, 128, 132, 124 of the cylinder model 120. Initial view 122 is a view directed to the side of the cylinder model 120. Final view 124 is a view directed at the end of the cylinder model 120. Typically, several different actions (and thus several different controls) are required to manipulate the view from initial view 122 to the final view 124. The initial view 122 must be zoomed out 126, resulting in the second view 128. The second view 128 must then be rotated 130 to the third view 132. Finally, the third view 132 must be zoomed in 134 to arrive at the final view 124. FIGS. 3, 4, 5, and 6 show renderings corresponding respectively to the views 122, 128, 132, 124 in FIG. 2.

As shown by the viewing of the cylinder model 120 discussed above, manipulating a view or camera to a desired view can take several different actions, which is often unwieldy (requiring switching between multiple modes) and is time consuming. Switching between modes or controls will also interrupt an operation being performed on the object, for example painting, drawing, reshaping, etc. Furthermore, in the case of a person virtually viewing or operating on a virtual workpiece (e.g. an artist virtually painting a three-dimensional model of a frog), the person would like to manipulate the model as they would a real-life model; by viewing different parts of the model surface while keeping the model virtually facing the artist and at a constant virtual viewing distance. This kind of viewing can be defined as object-centered or object-centric viewing. Considering the role of the surface of the model in viewing the model, this kind of viewing can also be defined as surface viewing; the process by which people, for example artists, have an area of constant visual focus distance and position themselves or the object (or both) to change the contents of the focal area while otherwise maintaining the focal area and distance.

With the mode-based or multi-control view manipulation, a viewer or artist must repeatedly make a series of manipulations similar to the cylinder view manipulations 126, 130, 134 shown in FIG. 2. For non-spherical, asymmetric or irregular models, simple rotation about a fixed point is not sufficient because the viewing distance from the view to the surface changes with rotation, and the surface of the model at the center of the view may not face toward the viewer. Furthermore, simply arranging the camera based only on tangents of the surface is not sufficient because tangents may not be well defined (for example at edges, corners, or protruding points), or the object may be a series of curves in space, or a cluster of points for which no tangents exist, which can cause a moving camera to drastically jump from one view to another when moving across the edge.

Figure 7:
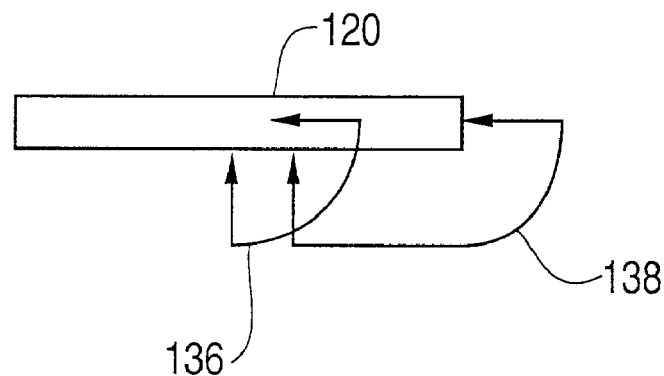
FIG. 7 shows a prior art camera path 136, and an exemplary camera path 138 according to the present invention.

FIG. 7 shows a prior art camera path 136, and an exemplary camera path 138 according to the present invention. The use of one camera movement input, such as a tumble movement, to produce the prior art camera path 136 results in a camera position inside the cylinder 120. The use of one camera movement command with the present invention creates a camera path 138 that maintains a similar view of a new part of the cylinder 120.

Figure 8:
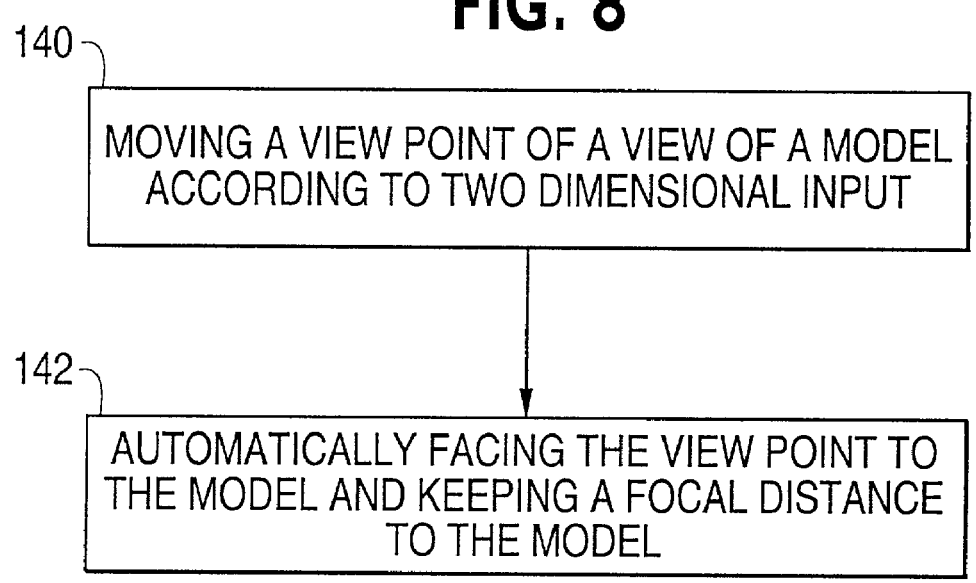
FIG. 8 shows an approach of the present invention that enables a user to simultaneously and intuitively manipulate a view or the parameters of a view with only two-dimensional input.

FIG. 8 shows an approach of the present invention that enables a user to simultaneously and intuitively manipulate a view or the parameters of a view with only two-dimensional input. First, a view point of a view of a model is moved 140 according to two-dimensional input (e.g. mouse input). Then, the view from the view point is automatically faced 142 toward the model and appropriately distanced from the model. With the steps of FIG. 8, it is possible to simulate the experience of holding and turning an object without separately tumbling, panning, and zooming. That is to say, with two-dimensional input it is possible to manipulate, in the three-dimensional space of the object, an object-centric view.

Figure 9:
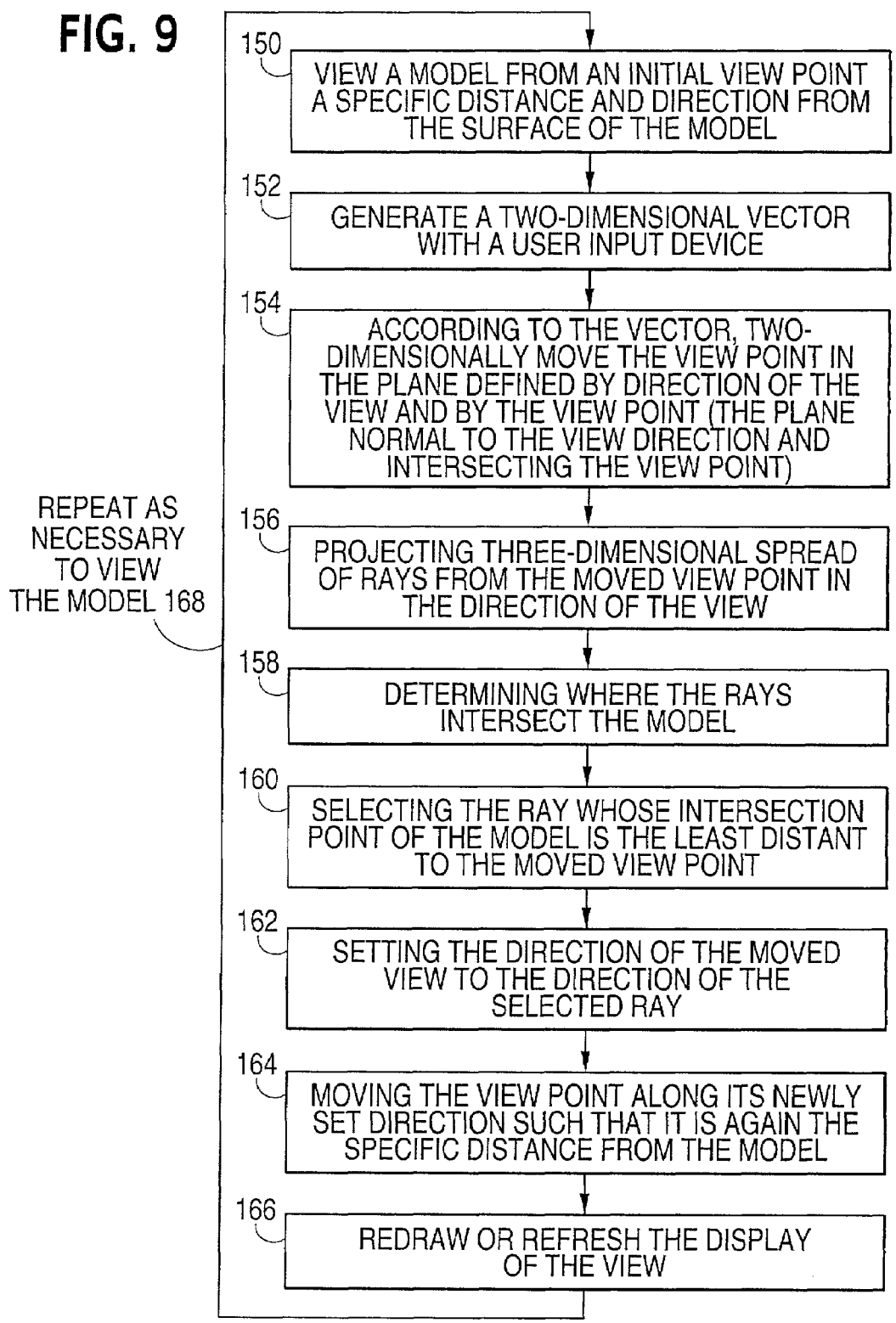
FIG. 9 shows detailed operations used to carry out the process shown in FIG. 8.

FIG. 9 shows detailed operations used to carry out the process shown in FIG. 8. Moving 140 a view point of a view of a model begins with initially viewing 150 the model from an initial view point that has a view direction to the model, and that is a specific distance from the surface area of the model, according to the view direction. Two-dimensional data (e.g. a vector) is produced or generated 152, as for example by a mouse drag, mouse movement, mouse stroke, key combination, stylus movement, etc. Two-dimensional input data can also be automatically or programmatically generated, as for example by a program that moves the camera, a walkthrough or "fly-by" generator, a camera directing script, etc.

According to the two-dimensional vector, the view point is two-dimensionally moved 154 in the plane defined by the direction of the initial view and the initial view point (see stage B of FIG. 10, further discussed later). That is to say, the vector can be scaled and applied to the initial view point in the plane normal to the view direction of the initial view and also intersecting the initial view point. Although the view point is moved within a plane, its movement is three-dimensional relative to the model. In the shell embodiment discussed in detail further below, the view point may be moved on a shell.

After the view point is moved 154 in the plane to a second view point position, the closest point of the model to the second view point may be found by projecting rays 156 from the second view point (see stage C of FIG. 10), determining 158 points where the rays intersect the model, and searching for or selecting 160 the ray whose intersection point is closest to the second view point. The rays may be projected 156 based on the initial direction of the view point, and may be projected 156 in a sampling cone, a pyramid or other three-dimensional configuration or spread. The rays may be uniformly spaced, or they may be algorithmically distributed. Other known methods beside ray projection may be used to solve the common problem of finding a nearest point in three dimensions.

The view direction of the moved view may be set 162 to the direction of the ray that was selected 160 (see stage E of FIG. 10), and the moved view point may then be moved again, along its newly set direction to again be the specific distance from the model (see stage F of FIG. 10), where the specific distance is determined according to the new view direction and the closest point of the model. The finally adjusted new view of the model may be shown by redrawing or refreshing 166 a display of the view, according to the appearance of the model within a view plane window of the view centered on the new view direction. An image or display of the view may be generated and displayed with conventional three-dimensional rendering techniques.

By repeating 168 the process, for example in response to further two-dimensional mouse movement data, the model may be smoothly viewed from different points, each with generally the same focal length to the object's surface or area of interest, and while generally keeping the object facing the view. Although the surface viewing distance may be constant, zooming occurs because the distance between the view and a fixed point of the object (e.g. center) changes. Because the center of a view (view direction) is oriented to the closest point of the model, the model faces the view (is locally normal to the view direction). When the closest point does not have a well-defined normal vector (e.g. the closest point is a corner), the view moves smoothly about the closest point (corner) because each position of the view may be based on the previous view, as explained further below with reference to FIG. 11.

Figure 10:
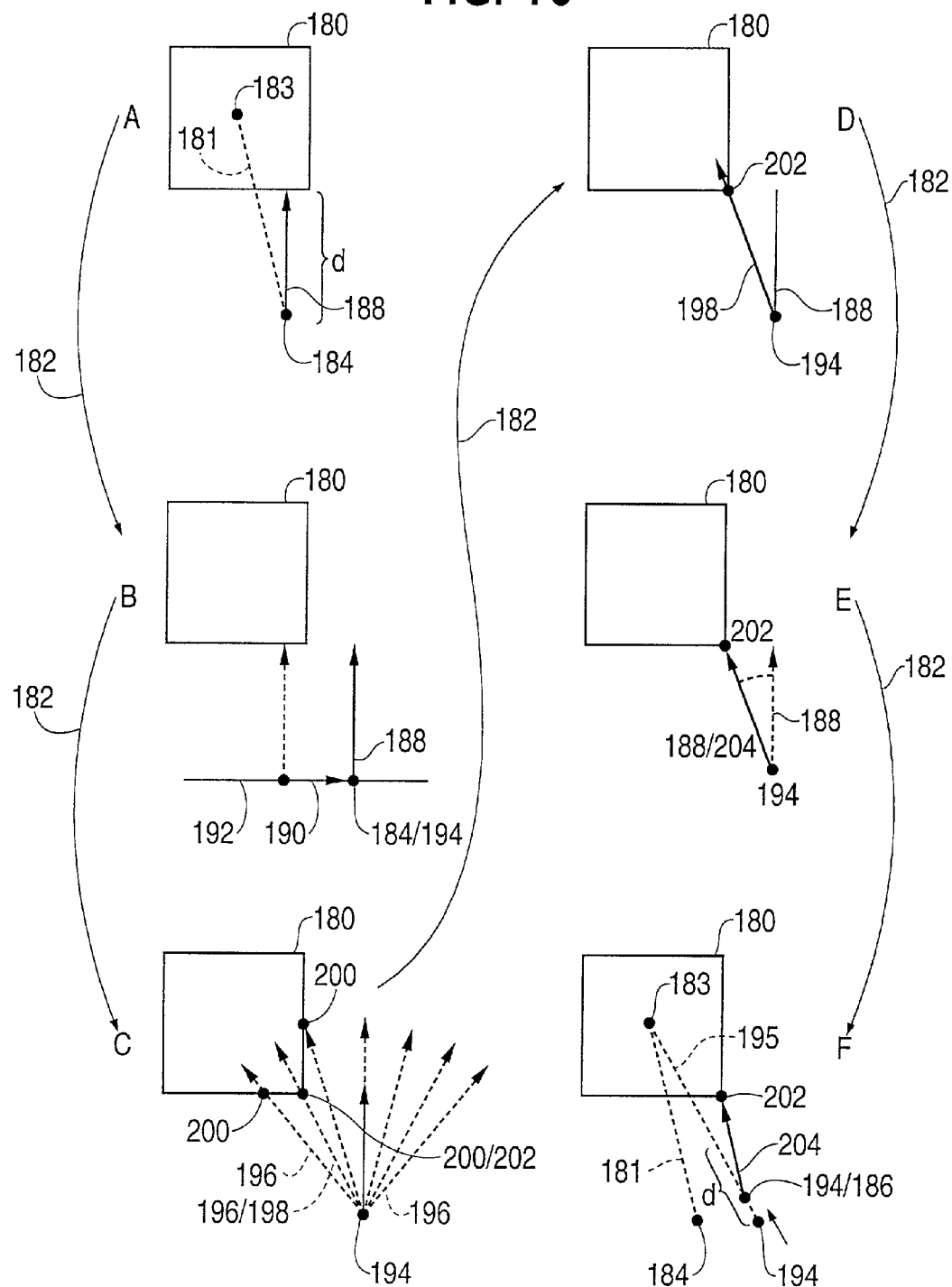
FIG. 10 is a two-dimensional depiction of a changing view of a cube 180.

FIG. 10 is a two-dimensional depiction of a changing view of a cube 180. FIG. 10 shows a simplified view of a process that actually occurs in three dimensions; a square represents the cube 180. Dashed line segments 181 and 195, discussed below, are included to show that the view is zoomed, panned, and rotated relative to the center point 183. Letters A through F are sequential stages. Arrows 182 in FIG. 10 indicate the chronological flow of events starting from initial view point 184 (stage A) and progressing to the final view point 186 (stage F). Initial view point 184 faces the cube in initial direction 188, and is distance d from the surface of the cube 180.

When two-dimensional input data is received, the input is scaled and applied to the camera position as a two-dimensional translation 190 in the plane 192 that is normal to or specified by the initial direction 188 (the viewing vector). The translation 190 of the view is preferably made without constraint to roughly express a desired position of the camera or view. However, a radial distance constraint may be placed on this move to smoothly approach an object if the camera is initially at a significant distance from the surface or area of interest of the model. Other constraints or interpolation can be used to further smooth the movement of the view.

After the position of the view point 184 has been translated 190 to new view position 194, rays 196 are cast out from the new position 194, preferably in a direction based on the initial view direction 188. For each ray 196, a point of intersection 200 with the cube 180 is determined. The ray 196/198 that has the closest point 200/202 on the cube 180 is selected. Although the rays 196 are shown in FIG. 10 in two dimensions, in practice they are cast out in three dimensions, preferably in the form of a cone or pyramid. The density of the rays 196 should be sufficient to obtain smooth movement along the surface of the model, preferably on the order of 100 rays. Other numbers may be appropriate for other cases.

Ray casting is a common technique described in readily available computer graphic references. Other methods for finding a closest point on the cube 180 may also be used. Furthermore, beside the direction to a closest point, other ray casting directions may be used. For example, the rays can be weighted by their distance and combined to obtain and use an average closest direction. The ray casting direction may be based in whole or in part on the direction of movement, etc. Other algorithms or statistics can also be used to define the direction in which an area of an object faces, including pre-determined values associated with regions of a model, or by mathematical calculation, as for example when the model is a Non-Uniform Rational B-Spline (NURBS) object.

After the ray 198 with the closest point 202 has been determined, the view direction 188 is set to the direction of the ray 198 with the closest point 202, so the final view direction 188/204 faces the closest point 202. Finally, the moved view point 194 may be again moved from point 194 to final view point 194/186 so final view point 186 is original distance d from the cube 180. Although a constant distance may be used, a dynamic distance may also be used. The view distance can be dynamically set according to an area of the model, a level of surface noise, a speed of the view point, etc.

Dashed line 181 (upper left hand corner and lower right hand corner) shows the initial view 184 relative to the center 183 of the cube 180. Dashed line 195 (lower right hand corner) shows the final view 194/186 relative to the center 183. The difference between lines 181 and 195 demonstrates that, relative to the center point 183, the distance to the center point 183 has been changed (zoomed), and the direction to the center point 183 has changed (panned and rotated). With other fixed points in the three-dimensional space, the same relative changes occur.

Figure 11:
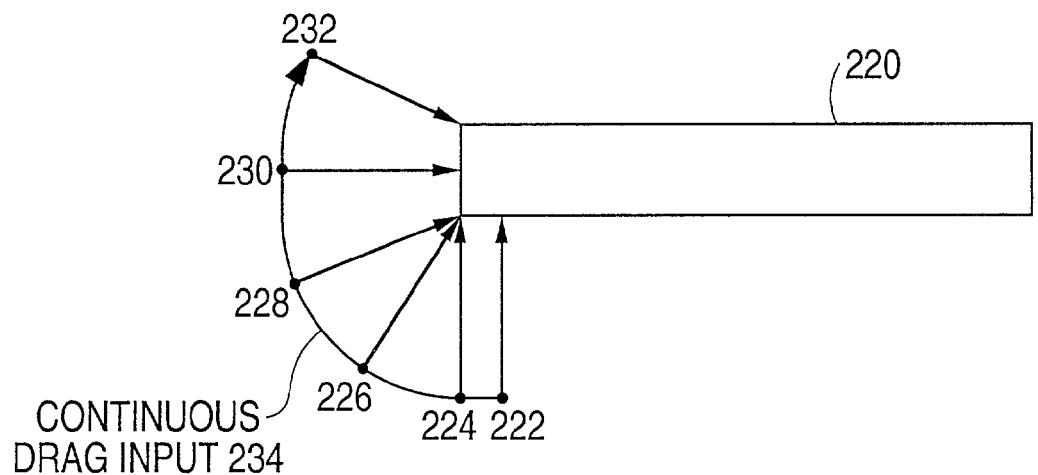
FIG. 11 is a two-dimensional view of a series of camera movements about a cylinder 220.

FIG. 11 is a two-dimensional view of a series of camera movements about a cylinder 220. The views 222, 224, 226, 228, 230, and 232 of the cylinder 220 are determined from a single mouse drag or stroke 234 according to an embodiment of the present invention as described above. The views

222 to 232 are numbered in chronological order. FIGS. 12, 13, 14, 15, 16, and 17 show rendered displays of the cylinder 220, corresponding respectively to the views 222, 224, 226, 228, 230, and 232 shown in FIG. 11.

Figure 18:
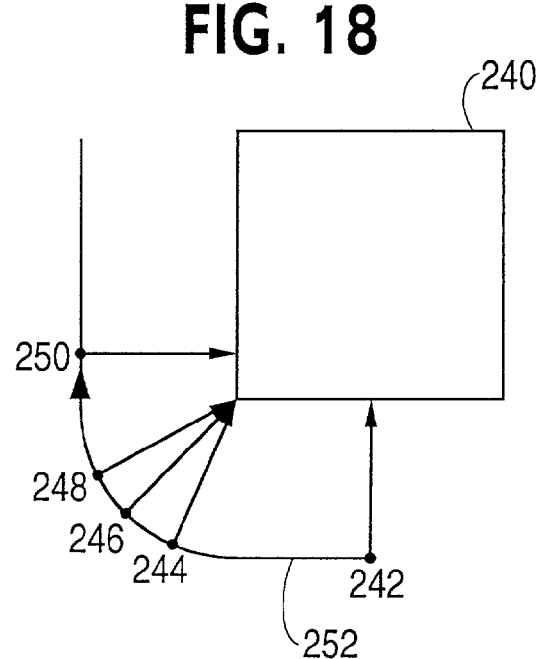
FIG. 18 is a two-dimensional view of a series of camera movements about a cube 240.
Figure 13:
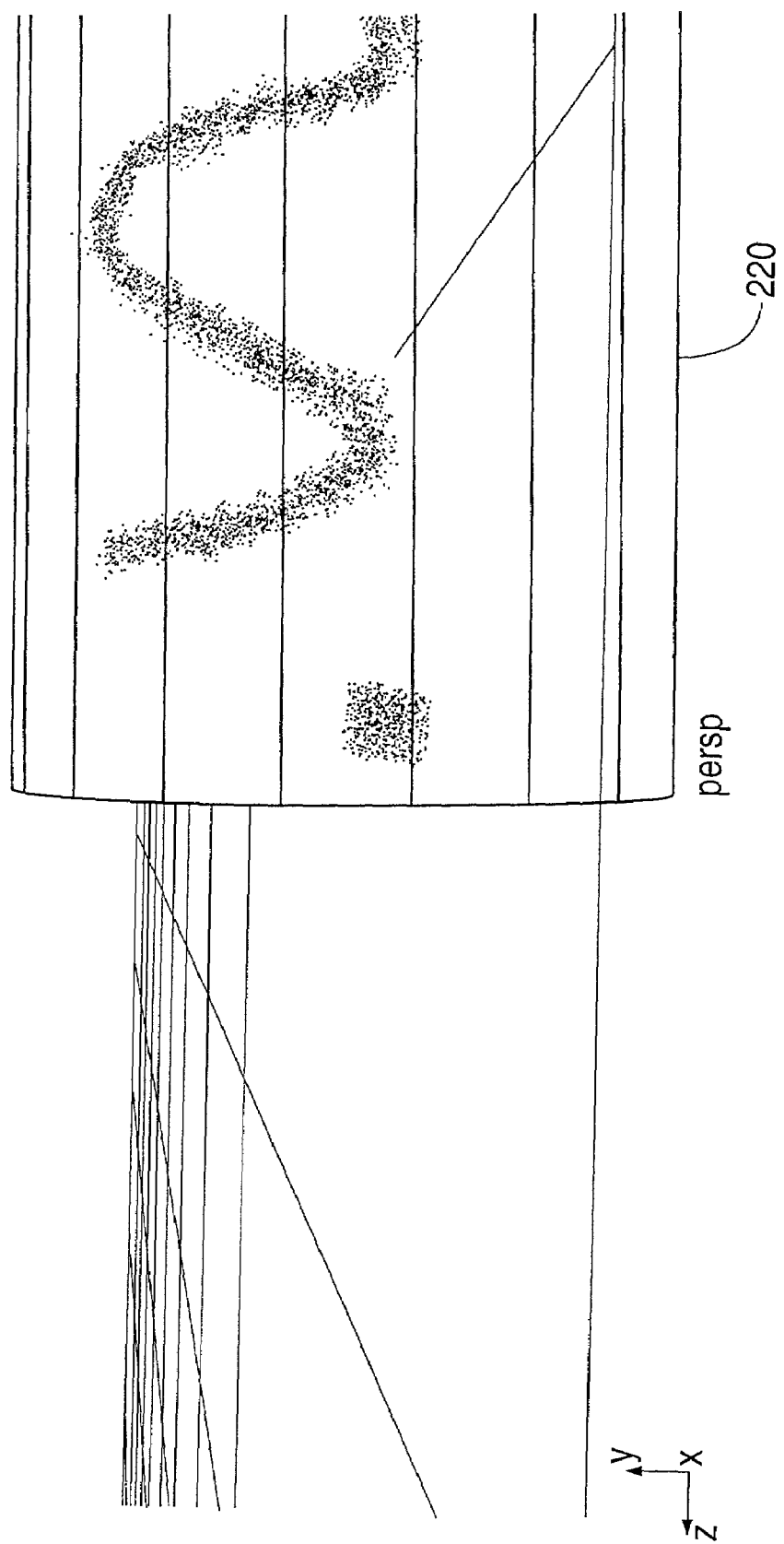
Figure 14:
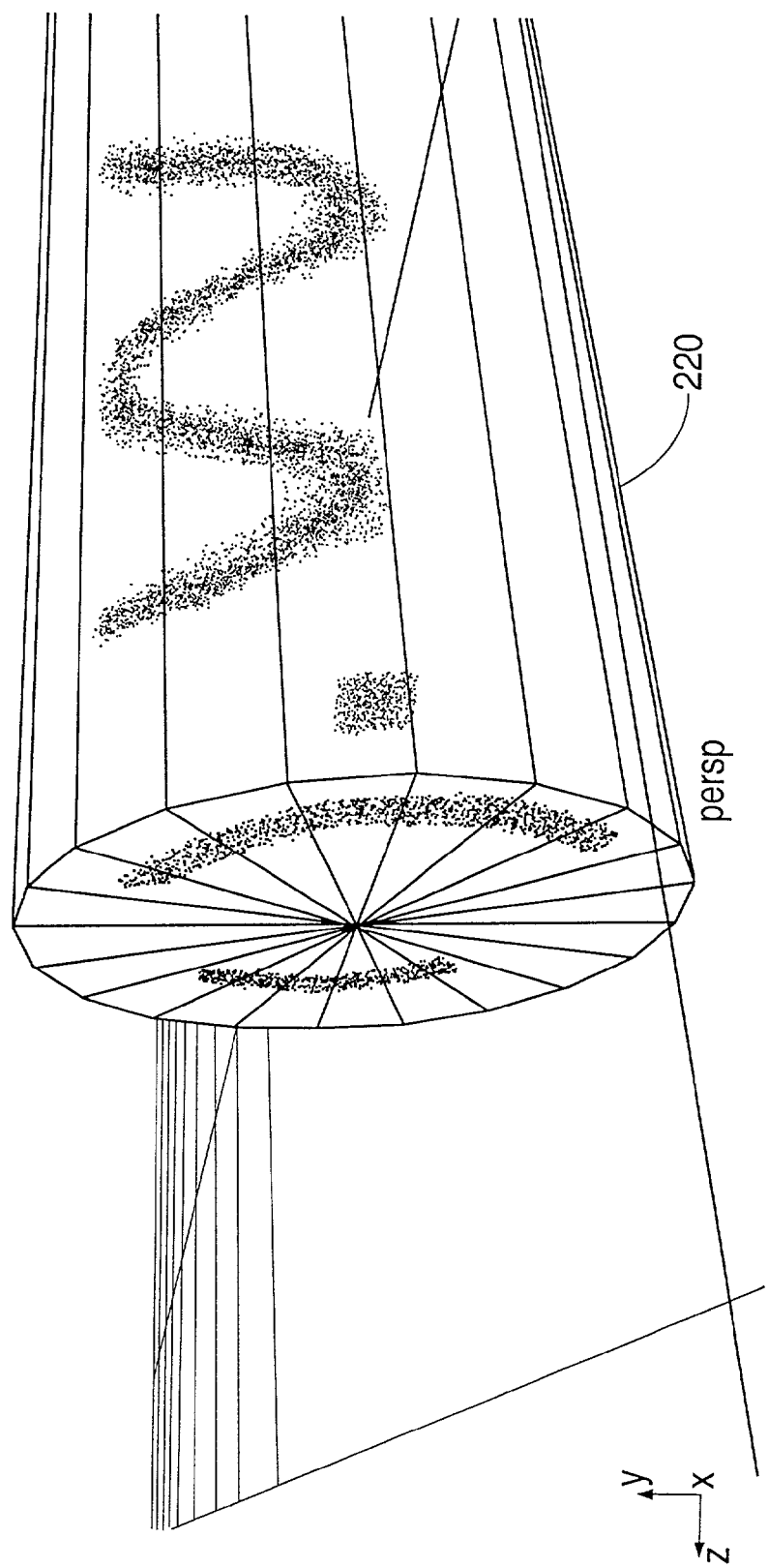
Figure 15:
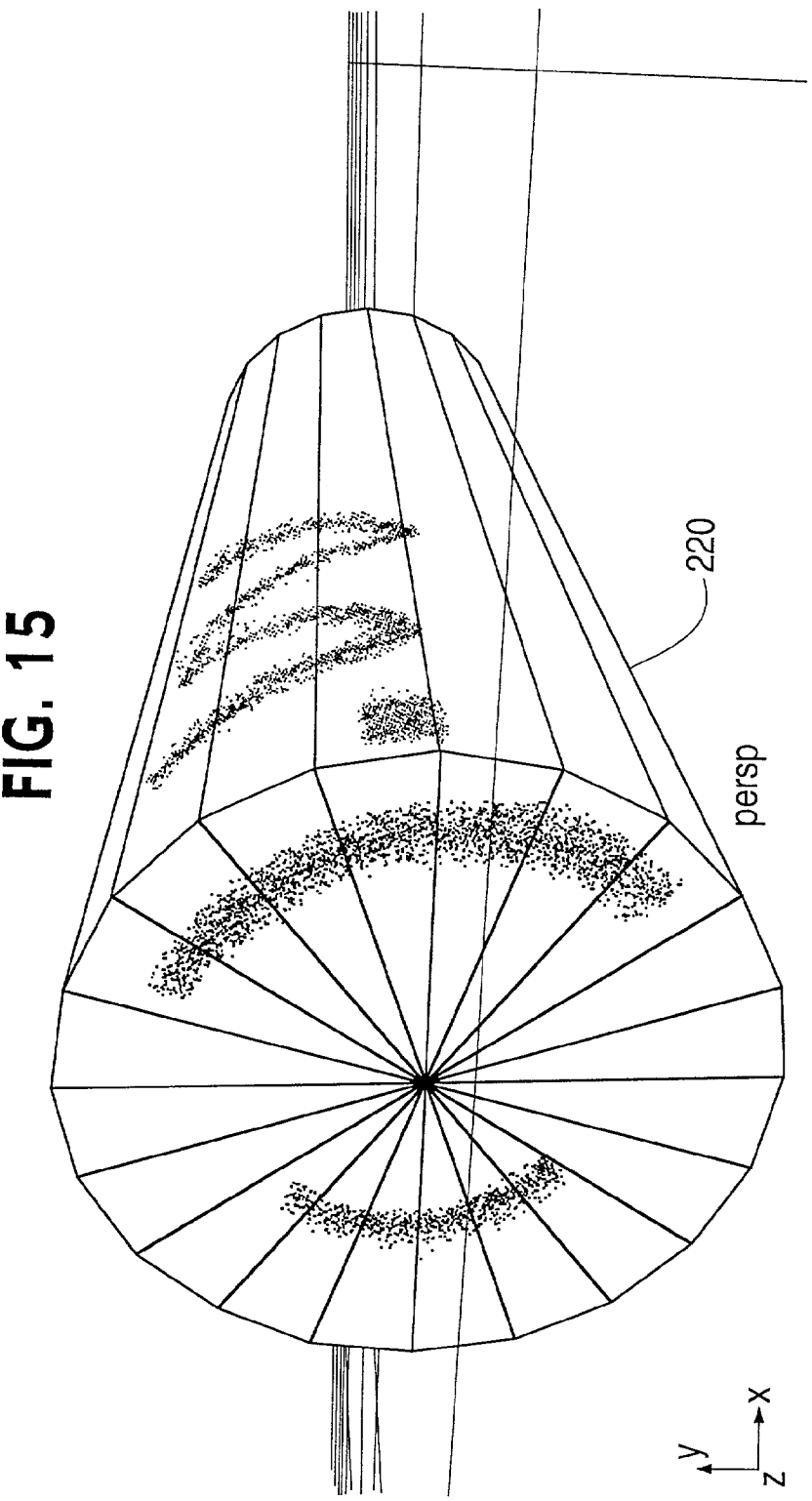
Figure 16:
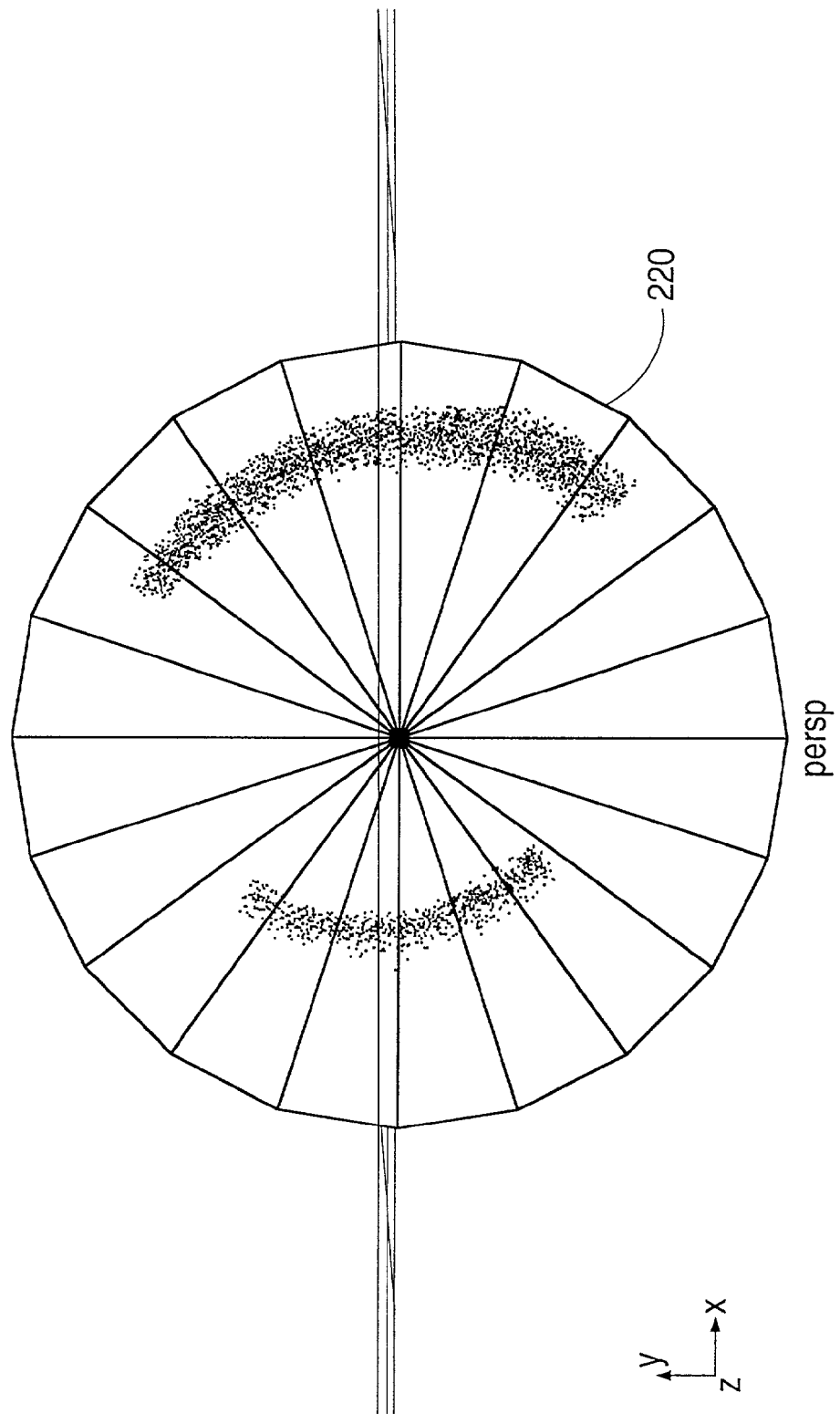
Figure 17:
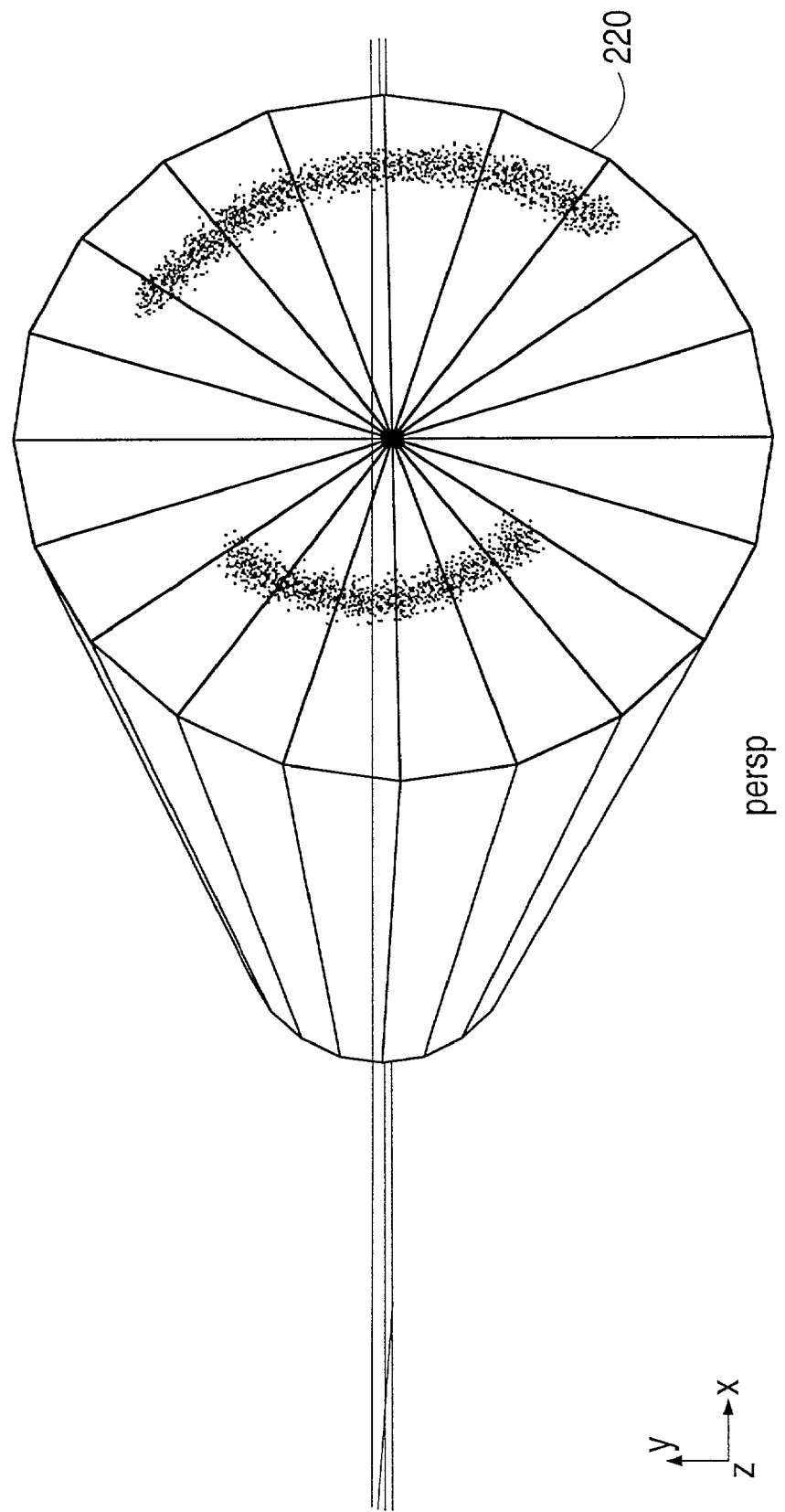
Figure 19:
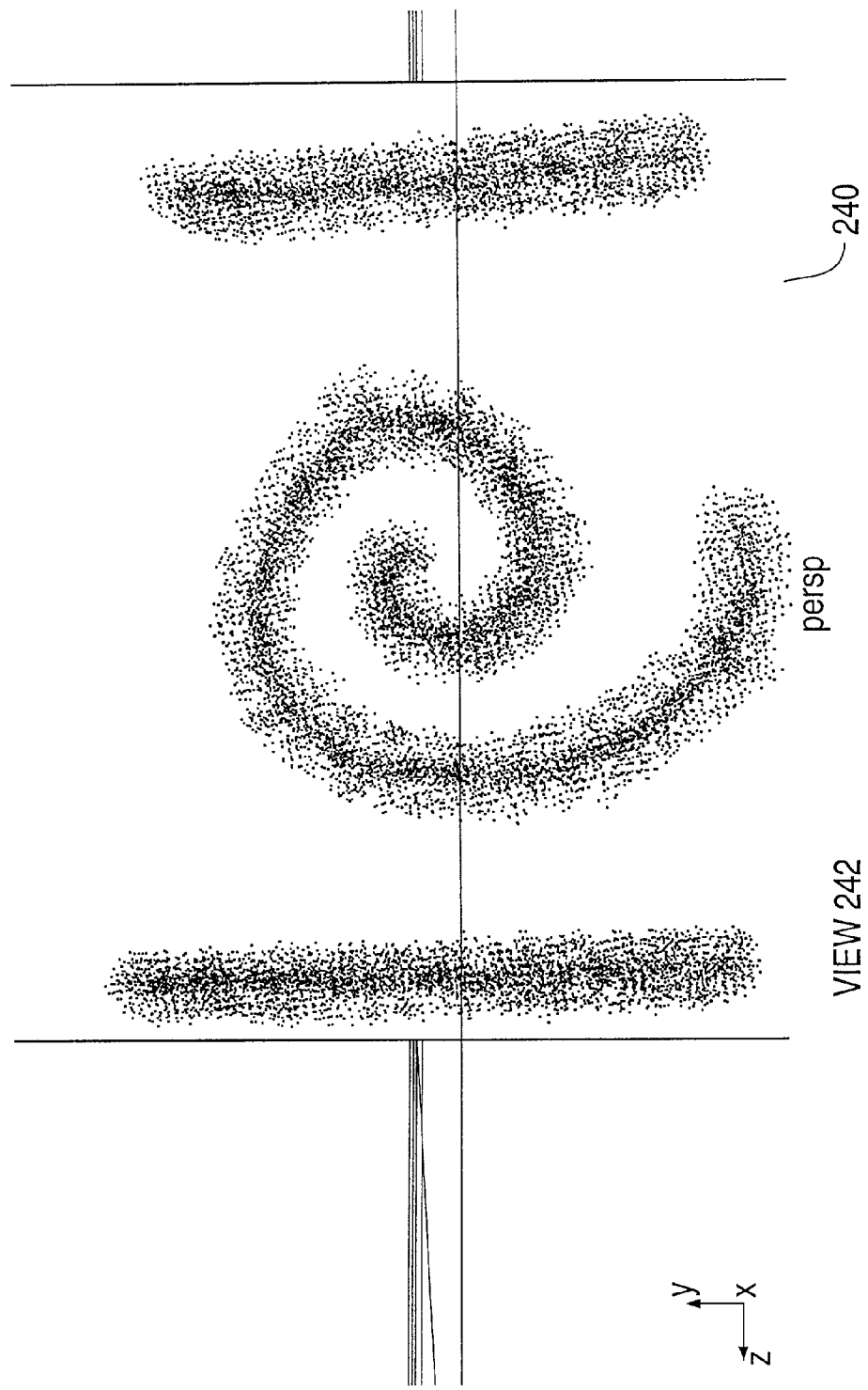
FIGS. 19, 20, 21, 22, and 23 show rendered displays of the cube 240, corresponding respectively to the views 242, 244, 246, 248, and 250 shown in FIG. 18.
Figure 20:
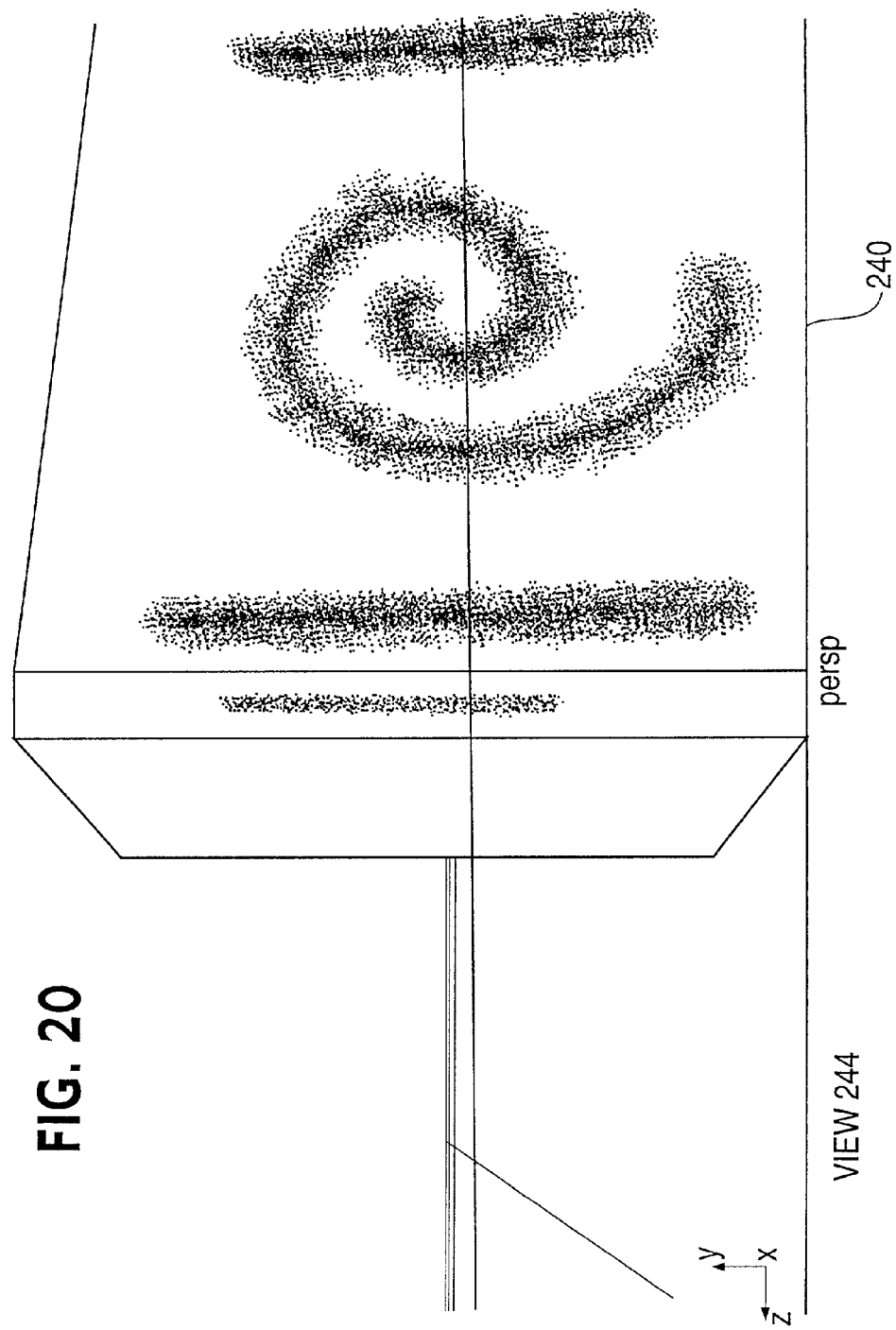
Figure 21:
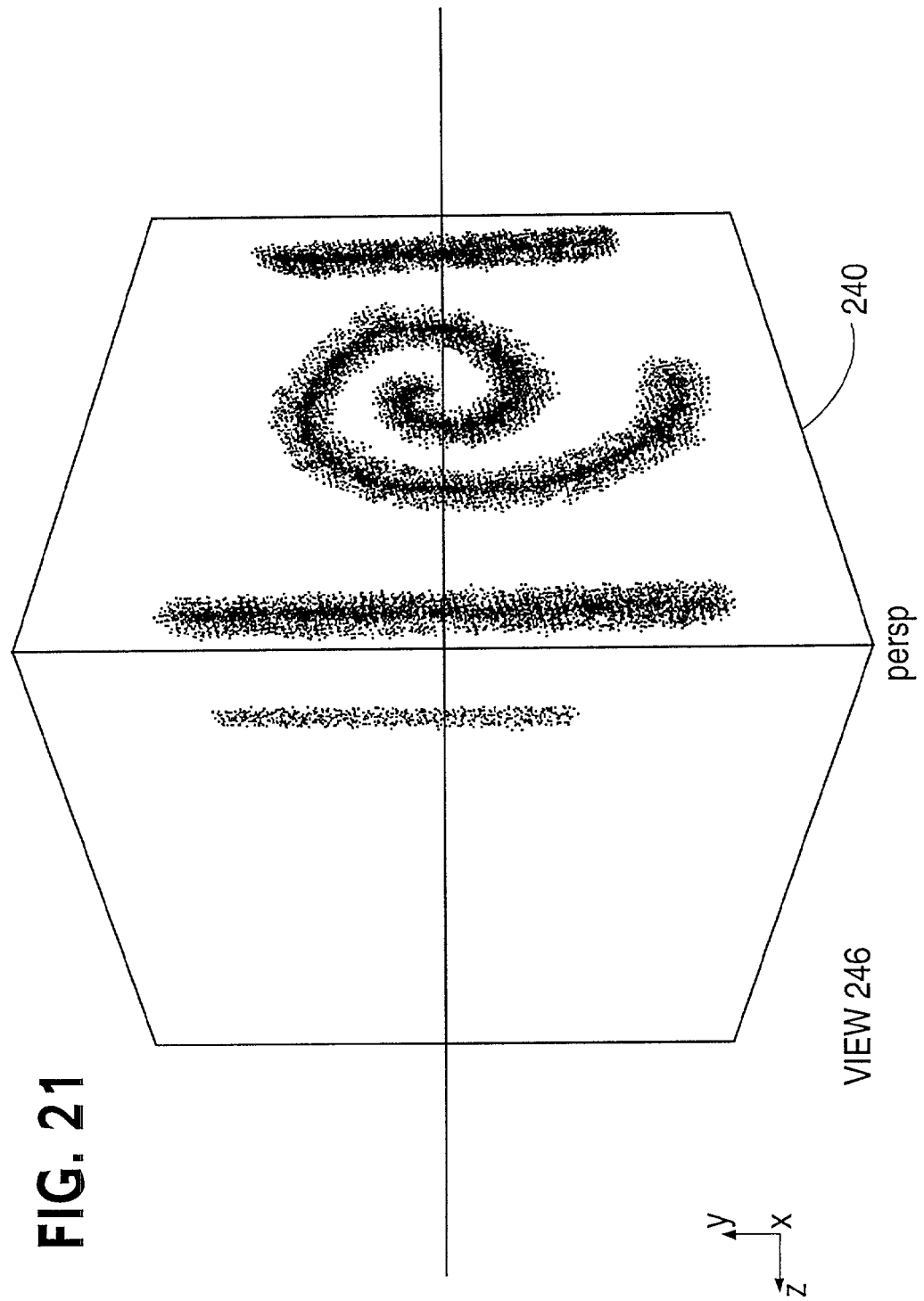
Figure 22:
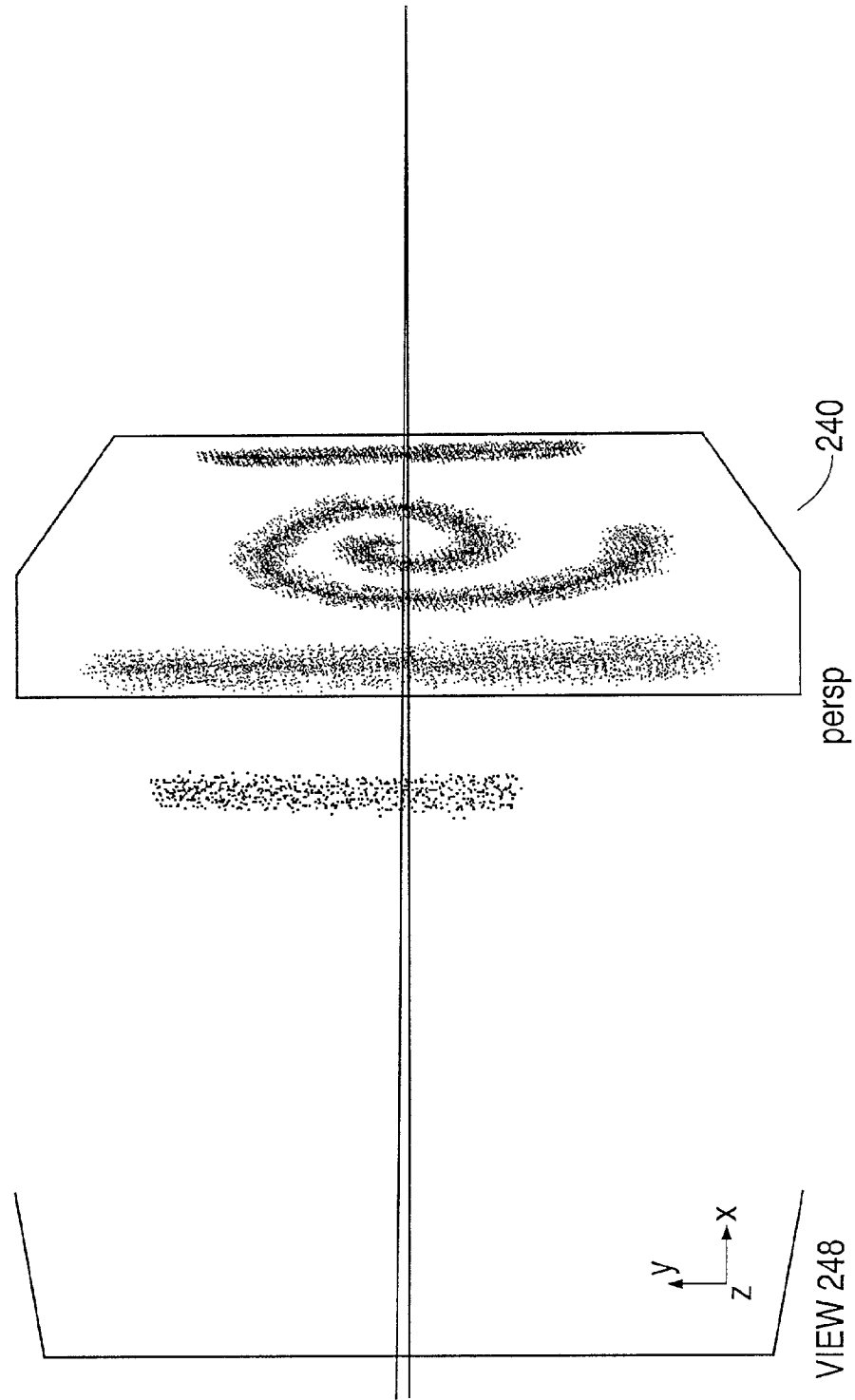
Figure 23:
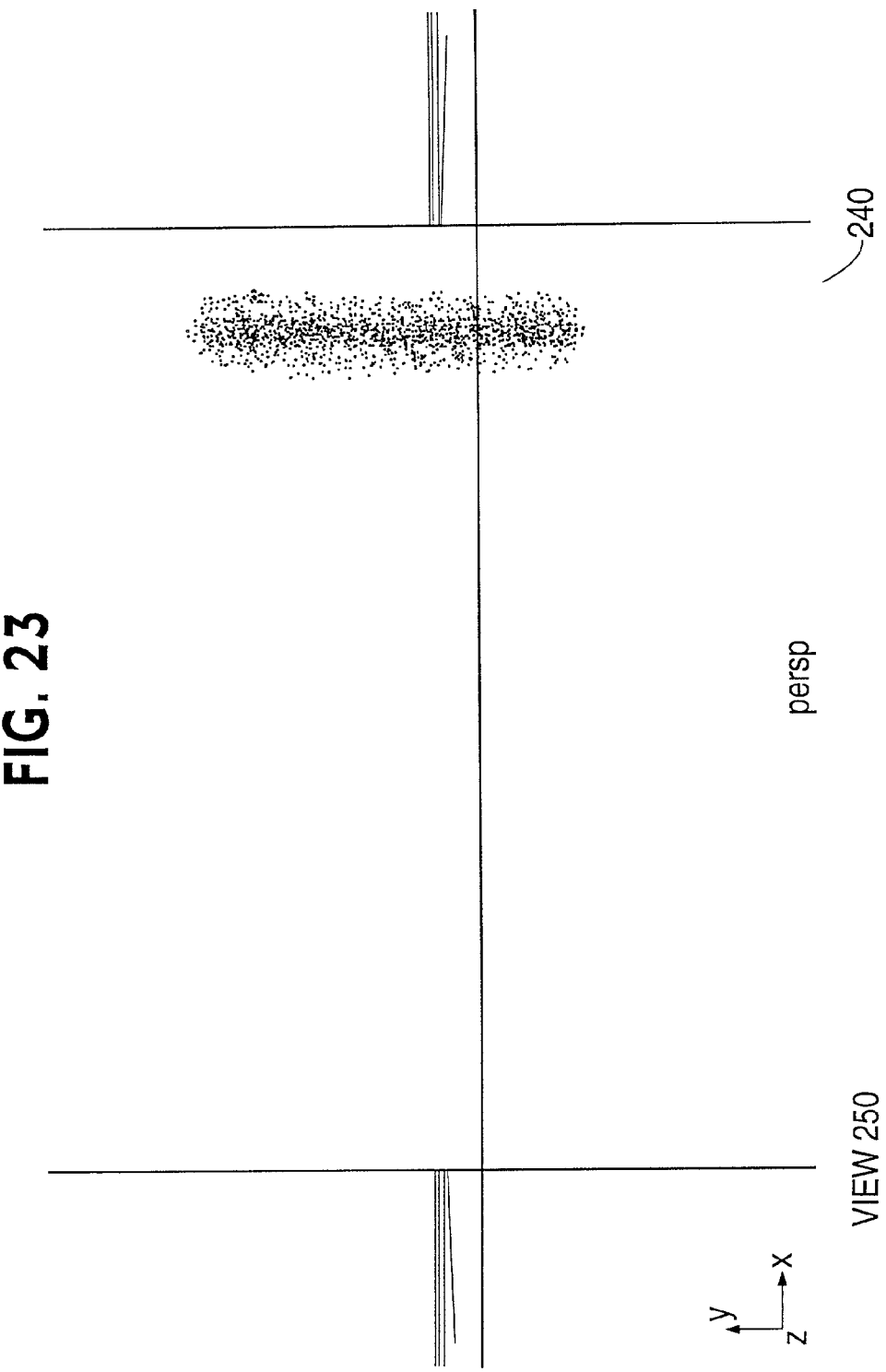

FIG. 18 is a two-dimensional view of a series of camera movements about a cube 240. The views 242, 244, 246, 248, and 250 of the cube 240 are determined from a single mouse drag or stroke 252 according to an embodiment of the present invention as described above. The views 242 to 250 are numbered in chronological order. FIGS. 19 through 23 show rendered displays of the cube 240, corresponding respectively to the views 242 to 250 shown in FIG. 18.

Figure 24:
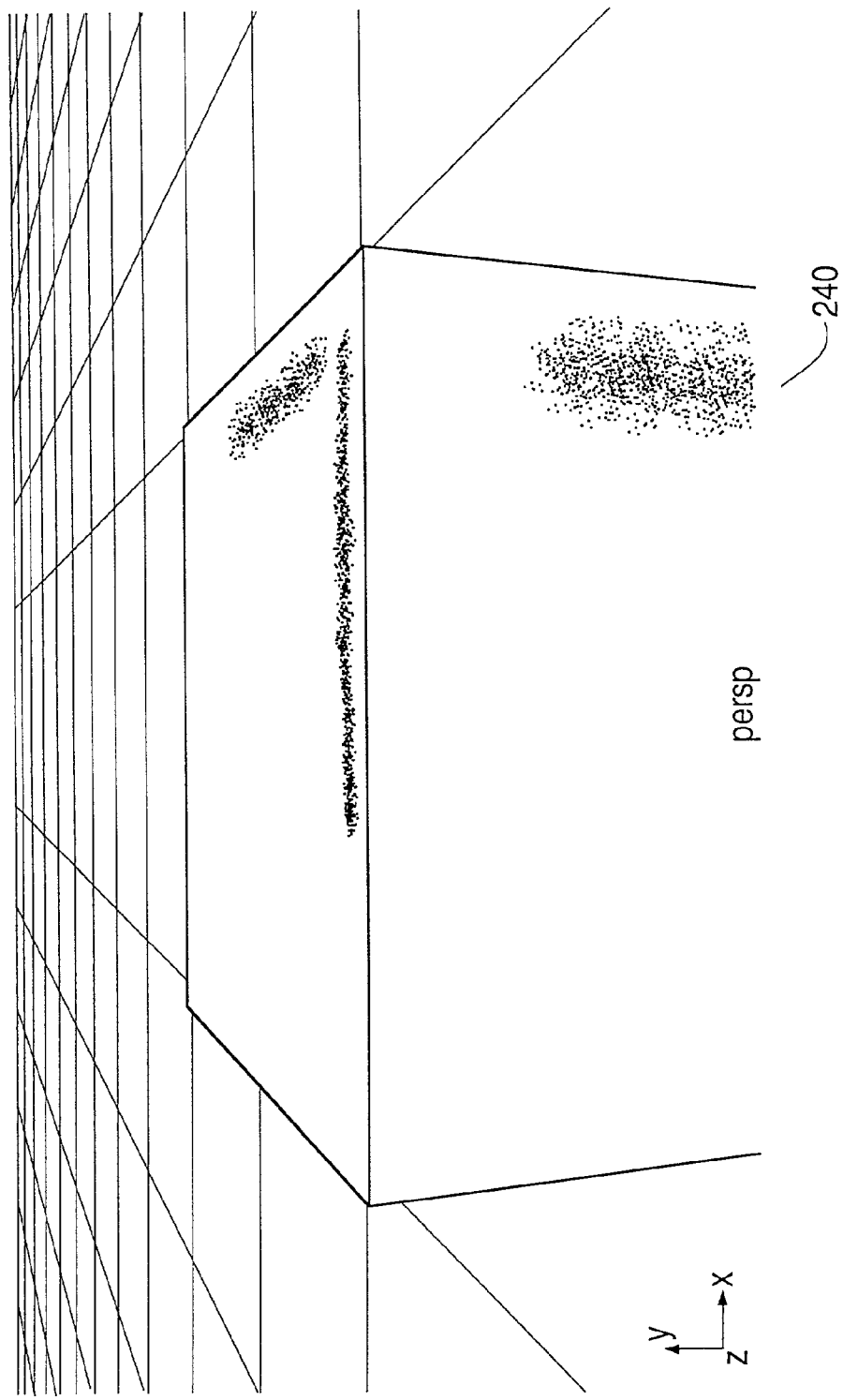
FIGS. 24 and 25 are other views of the cube 240.
Figure 25:
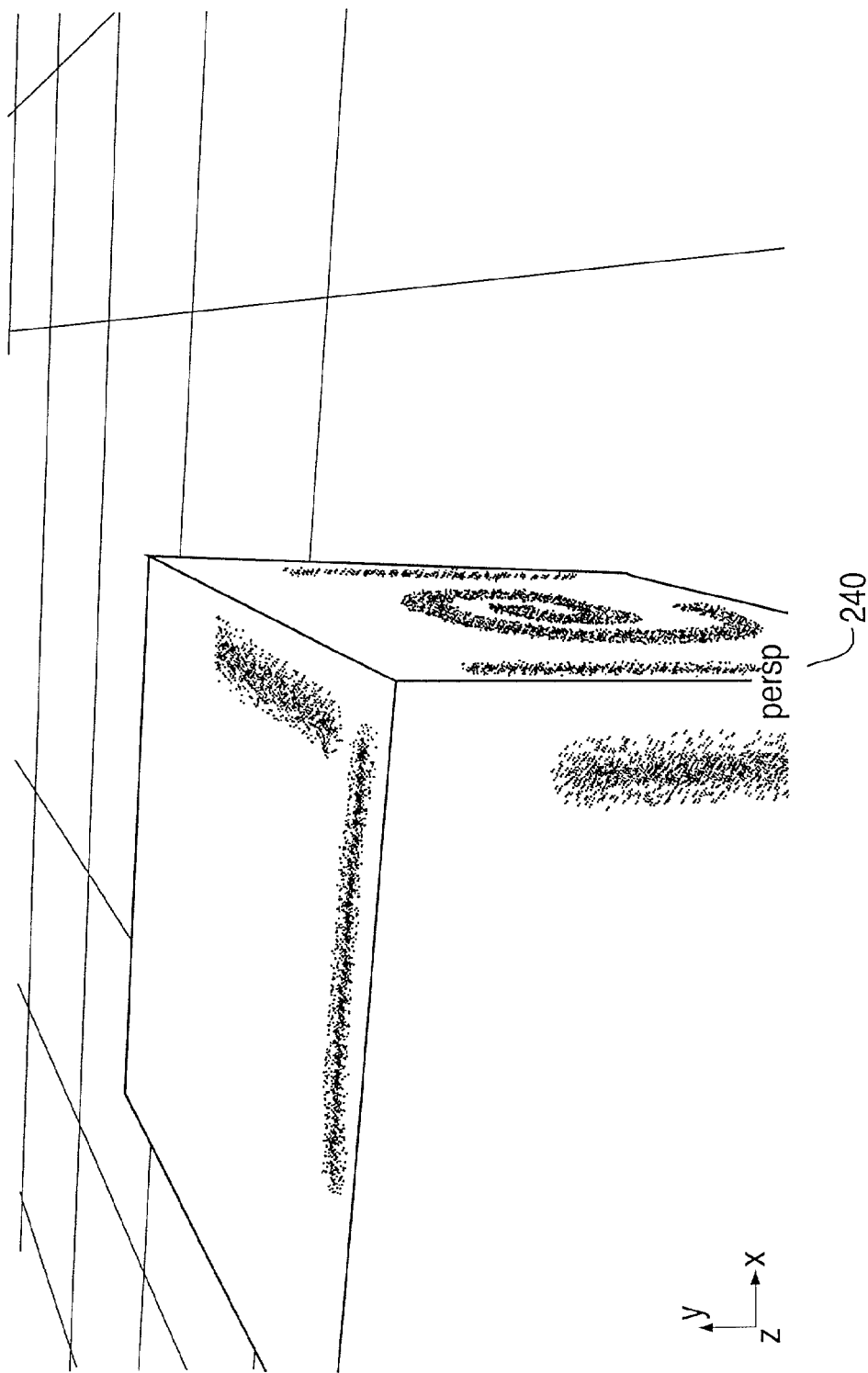

FIGS. 24 and 25 are other views of the cube 240. These other views of the cube 240 indicate that the present invention can move the virtual camera in three dimensions within the three-dimensional space containing the cube 240.

With a process as discussed above, camera manipulations that previously required two or more buttons or input commands can be performed with a single input, such as a mouse stroke or drag. One drag or one button+drag can now simultaneously control two or three of panning, zooming (distance to center of object), and tumbling.

While the present invention can control multiple simultaneous camera actions with a two-dimensional input, these actions can also occur individually. When the camera initially faces a point on a flat surface, and moves along the flat surface to another position facing another point on the same flat surface, the process becomes a simple panning motion. In the case of moving the camera along the length of the cylinder (parallel to its axis), the cylinder is simply panned across the view (while zooming with reference to a center of the object). When the camera moves in the direction of the curvature of the cylinder, the cylinder or camera is in effect tumbling or rotating about the axis of the cylinder. Even in the case of a complex object such as a spaceship, the object stays optimally in view and facing the view as the view moves about the spaceship.

With the process of camera adjustment and movement discussed above, the camera position may be used to determine the closest point, which may then be used to determine a new camera position and direction. However, it is not necessary to couple these factors with the camera position. A new camera position may be determined independently, for example by using a pre-calculated iso-distance shell (discussed below), and its direction need not be based on its new position. For example, the camera direction can be based on the geometry of the object.

Figure 26:
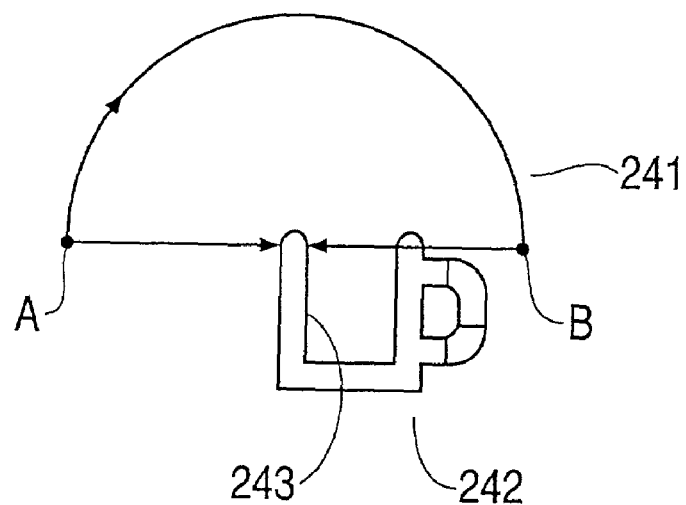
FIG. 26 shows a self-obstructing view of an object.

FIG. 26 shows a self-obstructing view of an object. With the present invention, some problems can occur when complex models or objects are being viewed, in particular self-obstructing objects. With self-obstructing objects, the area of the object to which the view is directed may be obstructed by another part of the object. For example, if a camera is moved about the cup 242 from point A in FIG. 26 to point B, the intended view of the inside surface 243 of the cup 242 becomes obstructed. A checking feature may be included that checks for and prevents movement of the view through obscuring parts of a model. Obscuration of the area or surface being viewed can also be avoided by providing a culling region around the camera for showing a cut-through (x-ray) view through an obstructing region. This can be done using conventional camera cropping or near-cropping, as found for example in Open Graphics Library (OpenGL).

Figure 27:
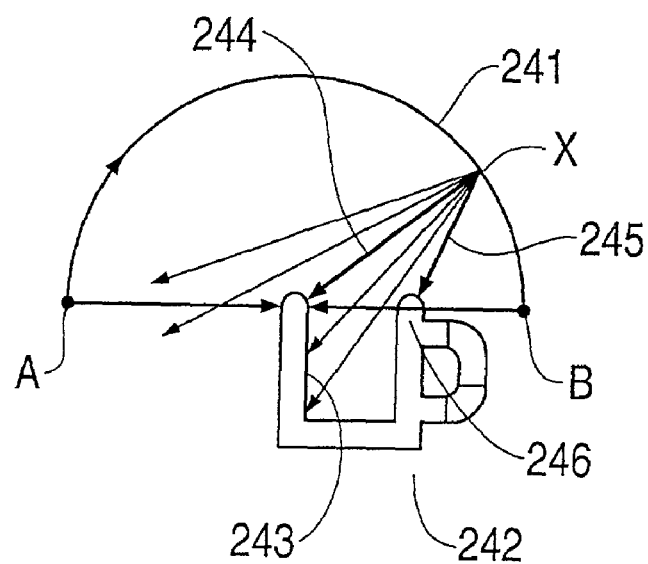
FIG. 27 shows a new camera position X with two rays 244 and 245 pointing to two possible closest points.

With complex objects, it is also possible, when arranging a view with the process discussed above, for two different points or areas of the object to simultaneously be closest to the view. This can cause the moving view to abruptly and unintuitively jump to an area of the object that is not contiguous with the previously viewed area of the model. FIG. 27 shows a new camera position X with two rays 244 and 245 pointing to two possible closest points. At point X, candidate ray 244 points to a desired closest view point, and candidate ray 245 points to another closest view point. If ray 245 is chosen for the new camera direction, then the view will "jump" from side 243 to side 246. If the search for the closest point is not restricted to the area of the current view, then the same problem can occur when a closer part of the object is "behind" the view.

For example, if the model or object is the cup 242, and the camera is facing the outside of the cup (point A) and is moved up the cup and over the lip to the inside region of the cup, a point on the opposite side of the cup could be considered when searching for the closest point. The movement or history of the camera can be used to restrict arrangement of the camera to arrangements that result in viewing connected, adjacent, or nearby surfaces. That is to say, a smooth viewing path can be maintained. If the model consists of polygons, such a restriction can be performed using polygons. In other words, if the camera is focused on a polygon and is moved, the movement can be restricted to keep the focus of the camera on adjacent, nearby, or connected polygons.

Obscuring may also be addressed by pre-computing a shell that surrounds the object or model. Such a shell can be calculated using a process similar to the camera arrangement process discussed above. A shell can also be computed or pre-computed (in advance of navigating an object) by using conventional techniques of "shrink-wrapping" an object (wrapping a sphere around the object and moving points on the sphere closer to the object until it reaches some small distance). An iso-surface or iso-distant shell can also be used. When a shell is pre-computed, ambiguities or self-intersections (e.g. the inside of a cup) can be automatically detected and eliminated before viewing or navigating. A shell is also a convenient way to smooth out a view of a noisy surface or model. Surface distance averages or other algorithms may be used for automatic smoothing.

Figure 28:
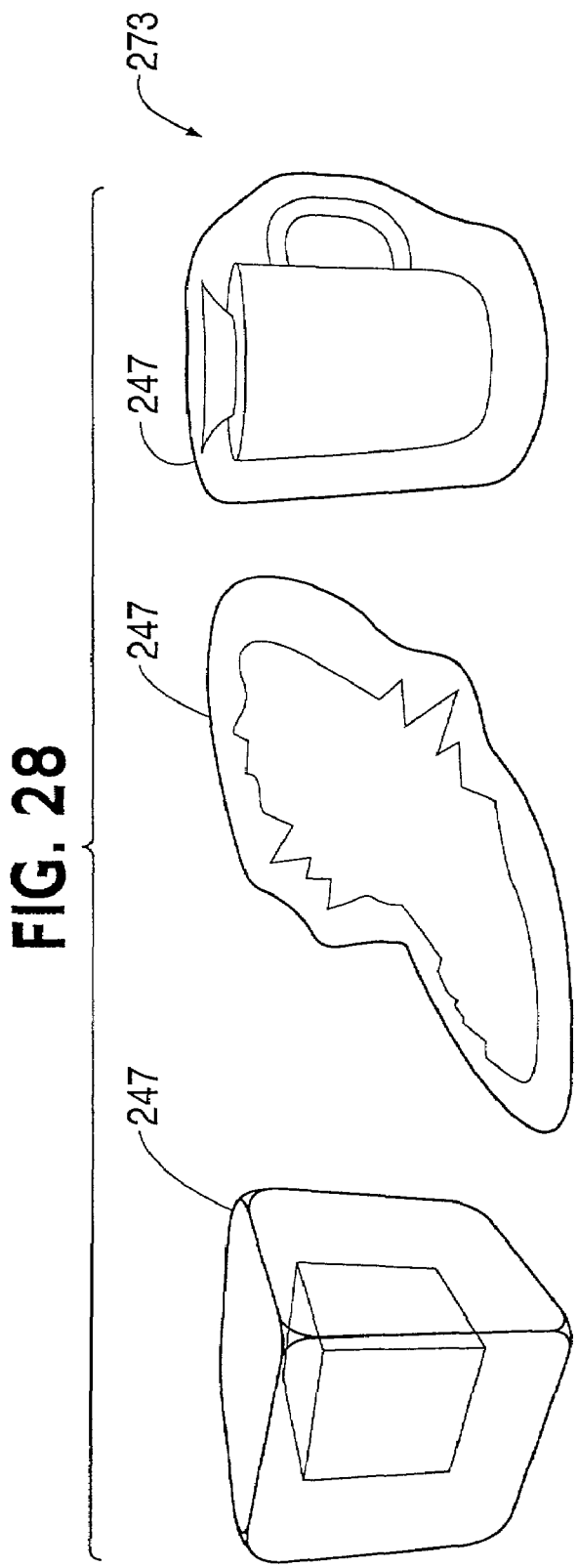
FIG. 28 shows examples of objects with shells 247.

FIG. 28 shows examples of objects with shells 247. With the present invention, a camera or tool can be constrained to the shell 247, and moved about on the shell while maintaining an object-centric view of the object within the shell. A shell 247 is preferably not displayed, but may be optionally displayed, perhaps semi-transparently.

The distance or zoom to an object from a view has been described as constant, however, it may also be dynamically determined. When two different areas of the model are candidates for facing the camera (e.g. the inside of a cup), the viewing distance could be reduced so that only the logically contiguous area is closest to the camera. The focal distance of a view can also be dynamically changed with regions of an object. For example, if a model of the earth is viewed, an orbital-scale focal distance could be used when the view is not close to any features of the earth, and a smaller distance could be used when the view is near an area or feature, such as a mountain. The distance to the surface of the object can also be determined by the surface noise or detail of the object.

The present invention has been described with a view direction or a center of view that is typically normal to the surface or view of the object. However, the view direction need not be precisely normal for the desired viewing effect. For example, variation can be allowed to smooth out the movement or change in the view. The view direction can also be allowed to vary within a certain range to enable some camera adjustment within the range that does not pan or move the view. A "pushable" area of view (e.g. a cone) can also be used. That is to say, the present invention may also be constructed to automatically move the three-dimensional view when input data indicates that the focus point is approaching or at the edge of the displayed view or the view area (e.g. the view plane window). When the focus point reaches that point, the corresponding part of the model is automatically moved into view. In other words, the user can push at or past the edge of the view and the model can pan and zoom responsive to the push. In this way, the invention may be invoked implicitly or explicitly.

The present invention may also be provided with an "up" direction defining the "up" direction of the view. An "up" vector or direction may be used to orient the rendered image of the view, giving the effect of a consistent up-orientation of the viewer relative to the viewed model. The "up" direction may be globally set. For example, it may be set to some point effectively infinitely distant from the object being viewed. The "up" direction may also be procedurally, algorithmically, or dynamically determined. For instance, "up" may be based on a history of the arrangement of a changing view. Different regions of an object may have different local definitions of up. "Up" may be set according to a direction of movement of the camera or relative to the movement direction. "Up" can also be context sensitive, for example it can be determined according to the orientation of relevant text. Using the "up" vector, the camera can also be made to pitch and roll as it moves.

Although the focal distance to the surface of the object is preferably constant, it may also be determined dynamically. While still using only a two-dimensional input device, the zoom or viewing distance can be changed based on the speed of the camera or input device movement. For instance, if the camera accelerates or goes above a certain speed, the zoom may be made larger (similar to the orbital radius of an orbiting body increases when the body accelerates). If the camera slows down, the zoom can decrease. Other schemes for changing the zoom or using the input speed may also be used to effectuate a consistent object-centered view.

As mentioned above, if an object is not initially at a desirable viewing distance from the camera, provisions may be made to smoothly approach the object, for example by smoothly interpolating to the optimum view. Smooth motion of the camera can also be improved by providing a threshold distance defining how minimally close a potential new focus point must be to the subject being viewed. For example, the points at which rays intersect a model would be required to be within a threshold distance of the previous focus point or the view point or else the point and its corresponding ray will be ignored. It is also possible to smoothly navigate the camera over high frequency (e.g. bumpy) surfaces. This can be accomplished by, for example, the use of a weighted or average preferred view direction as discussed above. This can also be addressed with the use of a pre-computed shell, discussed in detail further below.

Although the present invention has been described in terms of moving and adjusting a camera or view of a model, the present invention can conversely be equally considered and described with reference to moving or adjusting the model with reference to or relative to the view. Similarly, the present invention may also be understood as having a focus point on the model that is a tumble or rotation center with a fixed radius (focal distance) and that dynamically moves along the surface of the object as the camera moves. It is therefore apparent that the present invention is capable of providing an object-centric view facing the object, in which the object is optimally viewed for a given operation such as virtual painting.

Although the present invention may be used interactively with an input device, it may also be used to automatically generate walkthroughs or fly-bys for automatically viewing a model without interactive camera manipulation. The present invention may be used with volumetric applications in general. Although the present invention is capable of navigating a camera around an orbital shell using two-dimensional input, the present invention is also capable of navigating through orbital paths (or paths on the shell) using one dimensional input.

Figure 29:
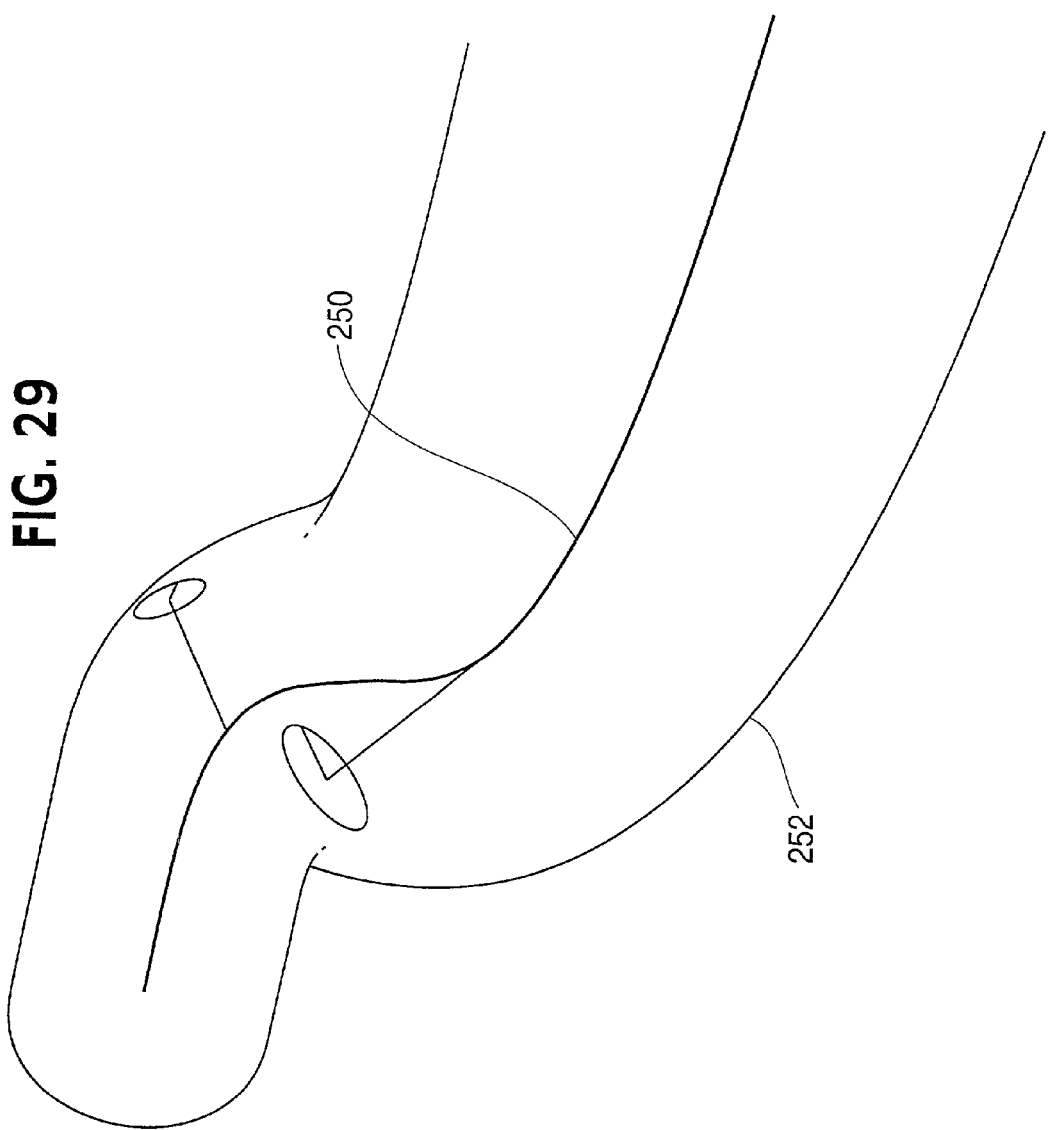
FIG. 29 shows a three dimensional B-spline curve 250.

Furthermore, a viewed or navigated model does not require a formally defined surface. The model or object can be or can include a cloud of points, and the surface or area of interest might be a layer or region in the cloud, rather than a surface per se. If the viewing distance is set to 0 then the surface may be painted on or the interior of a cloud may be navigated, viewed, or operated upon. A curve in three dimensions can also be viewed or navigated with the present invention. FIG. 29 shows a three dimensional B-spline curve 250. The curve 250 can be viewed by moving the camera around the hot-dog shaped shell 252.

The term "surface" is generally defined to mean the discrete surface defining a boundary between of the model. However, as discussed above, some models do not have defined boundaries (e.g. clouds), and therefore "surface" also is defined to mean a definable layer, stratum, or three-dimensional zone of a locus of elements of the model. For example, the "surface" of a cloud of points, voxels, or objects may be those elements of the cloud that are within (or beyond) a certain distance from a gravitational center or some other point or region of the cloud.

Figure 30:
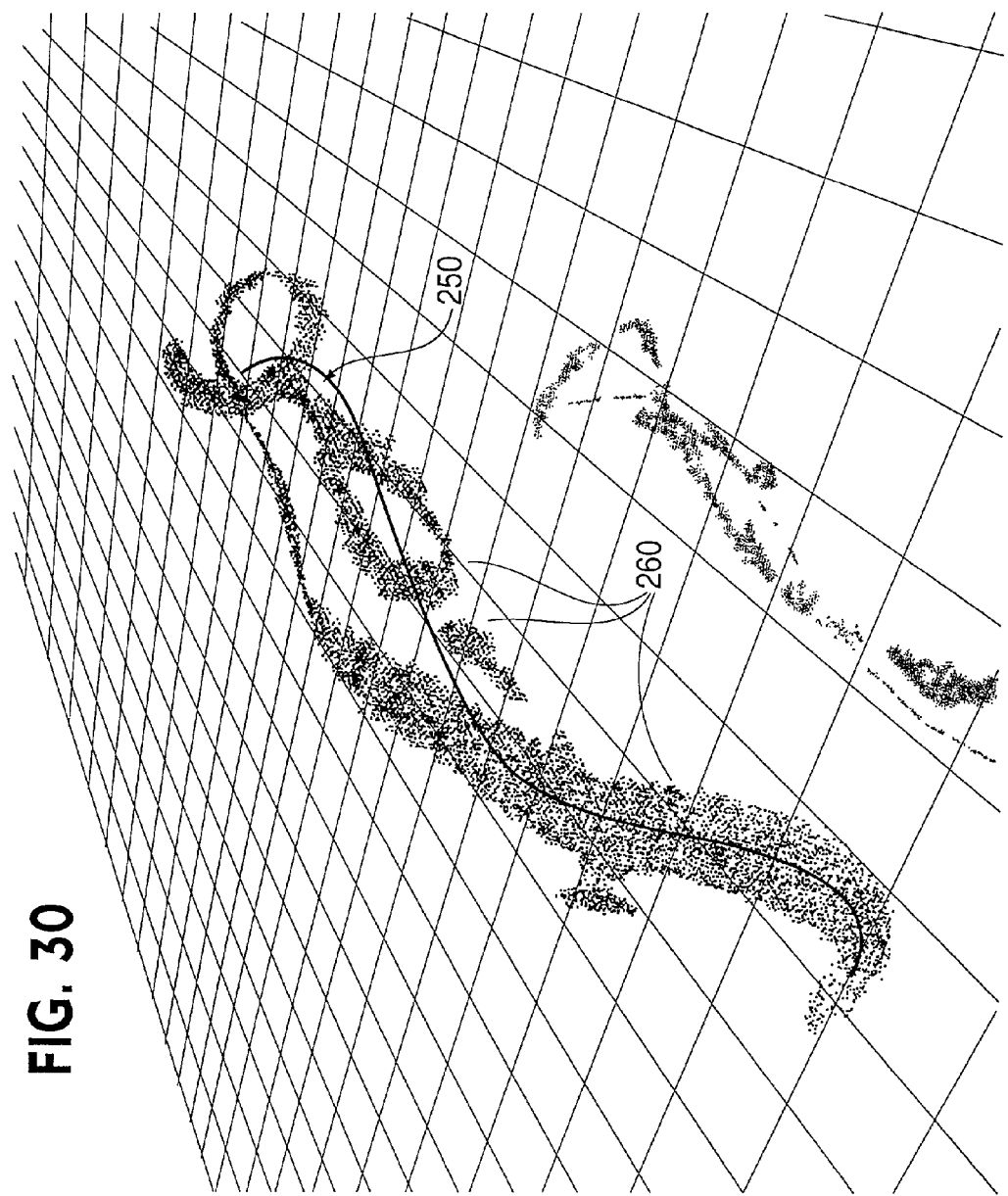
FIG. 30 shows volumetric painting around B-spline curve 250.

FIG. 30 shows volumetric painting about B-spline curve 250. In FIG. 30, the distance from the B-spline curve 250 to the shell 252 (not shown in FIG. 30) has been explicitly set by the user while painting, thereby creating the paint strokes or paint marks 260.

The present invention may also be used for three-dimensional view or navigation control within a web browser. With current browsers, three-dimensional views of models are manipulated with multiple controls. This can create problems such as the camera losing sight of the object or ending up in unidentifiable or irreversible positions. The present invention avoids these problems. Furthermore, because most web browsers are designed to receive and handle two-dimensional input events (e.g. mouse movement events), the present invention is well-suited for object-centric viewing or navigation within a web browser. A browser can be enhanced with a separate add-on or by direct modification.

Figure 31:
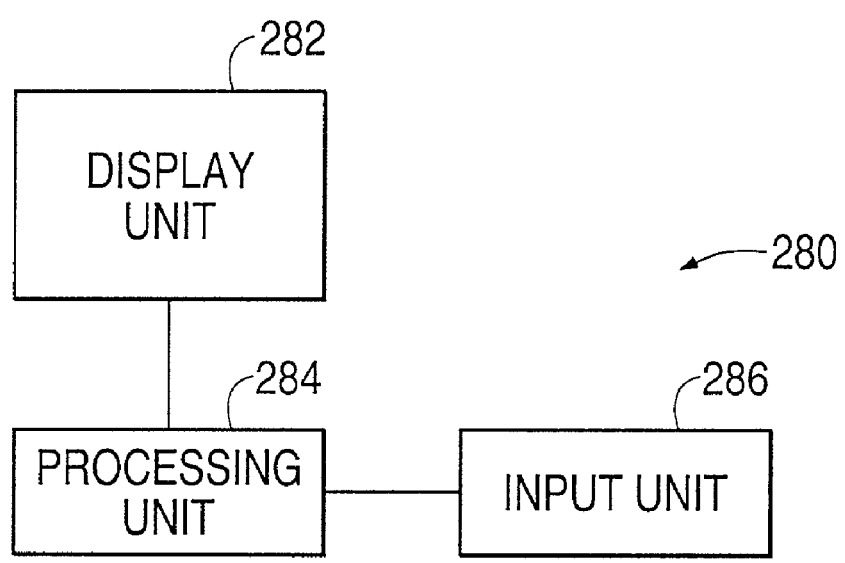
FIG. 31 shows hardware of the present invention.

FIG. 31 shows hardware of the present invention. The present invention is included in a system 280, such as depicted in FIG. 315, which includes a display 282 upon which an output of the present invention may be displayed. A computer 284, preferably of high performance workstation type, performs the processes described herein and an input device 286, such as a mouse or stylus with pad, is used to control functionality described herein. The system 280 also includes storage (not shown), such as disc storage and RAM in which the processes of the present invention can be stored and on which the processes can be distributed. The processes can also be distributed via a network, such as the Internet.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A method of three-dimensional viewing or navigating a model, comprising:
   simultaneously tumbling, panning, and zooming a view of the model according to only two-dimensional input data and in association with a geometry of a scene.

2. A method for viewing or navigating a model, comprising:
   translating a location of a view of the model; and
   automatically orienting a direction of the view while maintaining a distance from the view along a normal to a surface of the model.

3. The method according to claim 2, wherein the normal distance is kept constant.

4. A method of three-dimensional viewing or navigating a model, comprising:
   generating a two-dimensional input;
   panning a view of the model according to the two-dimensional input;
   automatically zooming the view according to the two-dimensional input; and
   automatically tumbling the view according to the two-dimensional input, where said panning, zooming, and tumbling are relative to a fixed point in the space on a surface of the model.

5. The method according to claim 4, wherein the model comprises a surface, and further comprising automatically maintaining a constant distance between the view and the surface while performing combined panning, zooming, and tumbling.

6. The method according to claim 4, wherein the model comprises a surface, and further comprising automatically keeping the view facing the surface while performing combined panning, zooming, and tumbling.

7. The method according to claim 4, wherein said combined tumbling, panning, and zooming are performed relative to a fixed point in a coordinate space containing the model.

8. The method according to claim 4, wherein the two-dimensional input comprises a single two-dimensional vector generated with an input device.

9. The method according to claim 8, wherein the input device is a mouse, and the vector is generated by a user moving the mouse.

10. A method of viewing or navigating a model comprised of curved or non-axis-aligned flat surfaces, said method comprising
    automatically moving a camera, according to interactively generated two-dimensional data, from a current position relative to the model, to a new position relative to the model; and
    at both positions, when the camera does not face the model, automatically reorienting the camera to the model at a distance from a surface of the model.

11. The method according to claim 10, wherein the distance is at least one of static and dynamic, where the dynamic distance is automatically determined based on the geometry of the model.

12. A method for viewing or navigating a model, comprising when a user provides navigation input, correspondingly changing an object-centric surface view of the model by traveling along the surface of the model an area of the model viewed by the surface view while otherwise automatically keeping the surface view constant.

13. A method of viewing or navigating an object, comprising when a user provides navigation input, correspondingly automatically changing, relative to the object, a center of a view of an object that is displayed according to a consistent object-centric surface view of the model while the object-centric surface view moves in three-dimensional space with an otherwise consistent object-centric surface view of the object.

14. A method for viewing or navigating a model, comprising:
    displaying a new surface area of the model viewed with an object-centric view of the model, by translating a portion of the model that is within the object-centric view while otherwise maintaining the object-centric view's distance from the model and keeping the object-centric view normal to the surface of the model.

15. A method of viewing or navigating a model, comprising:
    displaying a surface portion of a model within an object-centric view;
    displaying a new surface portion of the model within the same object-centric view; and
    while the object-centric view is moved by a user it automatically stays a same distance from the surface of the model and also automatically reorients to stay normal to the surface of the model.

16. A method of viewing or navigating a model, comprising:
    displaying a first surface area of the model, the first surface area facing a view point that is a distance from the surface; and
    displaying a second surface area of the model by changing, according to a two-dimensional interactive input, a position of at least one of the camera relative to the model, the model relative to the camera, and the camera and the model relative to each other, where the second surface area automatically faces the view point at the distance from the surface.

17. A data structure used to view or navigate a surface of a three-dimensional model in a three-dimensional space, comprising:
    a moving view vector comprising a view direction in the three-dimensional space and having a constant view length;
    a moving view point defining a position of the view vector in the three-dimensional space; and
    a moving focus point constrained to the surface, defined by said moving view point and said view vector, where said view vector ends at the focus point and said focus point and said view position are the constant view length apart.

18. The data structure according to claim 17, where said view vector automatically stays normal to the surface at the moving focus point.

19. A method of viewing or navigating a model, comprising automatically maintaining an optimal view for performing an interactive operation on the model while interactively manipulating the optimal view of the model with one hand.

20. The method according to claim 19, where the operation is at least one of painting, drawing, editing, and applying a tool.

21. A method of viewing or navigating a model, comprising:
- translating a camera that is movably positioned on an exterior shell of the model defined by a distance; and
- automatically facing the camera at the model in response to said translating.

22. The method according to claim 21, wherein the shell is pre-generated and is either a contiguous iso-surface of the model or a contiguous wrapping of the surface.

23. A method of interactively navigating or manipulating a view of a three-dimensional model, comprising:
- viewing a surface of the model from an initial view point with an initial view direction;
- generating a single two-dimensional vector by moving a mouse;
- translating, according to the vector, the initial view point to a next view point in a plane normal to the view direction and intersecting the initial view point;
- automatically finding a point of the surface that is closest to the next view point; and
- automatically setting a next view direction to a direction from the next view point to the closest surface point.

24. The method according to claim 23,
- wherein said finding a closest point comprises casting rays from the next view point with a three-dimensional spread in the direction of the initial direction, determining intersection points where the rays intersect the surface, finding distances between the intersection points and the next view point, and selecting the point with the smallest distance; and
- wherein said setting comprises setting the next view direction to the direction of a ray corresponding to the point with the smallest distance.

25. The method according to claim 24, further comprising translating the next view point toward or away from the closest surface point, along the next view direction, to a location that is a same distance from the surface as the initial view point as part of an interaction.

26. The method according to claim 23, further comprising translating the next view point toward or away from the closest surface point, along the next view direction, to a location that is a same distance from the surface as the initial view point as part of an interaction.

27. A method of interactively navigating or manipulating a view of a three-dimensional model, comprising:
- viewing a surface from an initial view point with an initial view direction;
- generating a single two-dimensional vector by moving a mouse;
- automatically translating, according to the vector, the initial view point to a next view point in a plane normal to the view direction and intersecting the initial view point;
- automatically finding a point of the surface that is closest to the next view point by casting rays from the next view point with a three-dimensional spread in the direction of the initial direction, determining intersection points where the rays intersect the surface, finding distances between the intersection points and the next view point, and selecting the point with the smallest distance;
- automatically setting a next view direction to a direction from the next view point to the closest surface point, wherein the next view direction is set to the direction of a ray corresponding to the point with the smallest distance; and
- automatically translating the next view point toward or away from the closest surface point, along the next view direction, to a location that is a same distance from the surface as the initial view point.

28. An apparatus for interactively manipulating a view of a three-dimensional model, comprising:
- a viewing unit viewing a surface from an initial view point with an initial view direction;
- an input unit generating a single two-dimensional vector; and
- a computing unit performing a process comprising:
  - translating, according to the vector, the initial view point to a next view point in a plane normal to the view direction and intersecting the initial view point;
  - finding a point of the surface that is closest to the next view point;
  - setting a next view direction to a direction from the next view point to the closest surface point; and
  - translating the next view point along the next view direction.

29. A method, comprising:
- moving a mouse in two dimensions;
- translating a three dimensional view to a new position in accordance with the mouse movement;
- determining an average distance from the new position to points of a model surface; and
- automatically orienting the view towards the model surface normal based on the average distance.

30. A storage medium storing data for performing a process of viewing or navigating a model comprised of curved or non-axis-aligned flat surfaces, the process comprising:
- automatically moving a camera, according to interactively generated two-dimensional data, from a current position relative to the model, to a new position relative to the model; and
- at both positions, when the camera does not face the model, automatically reorienting the camera to the model at a distance from a surface of the model.

31. An apparatus for three-dimensional viewing or navigating, the apparatus comprising:
- a processing unit performing a process, the process comprising:
  - automatically moving a camera, according to interactively generated two-dimensional data, from a current position relative to the model, to a new position relative to the model; and
  - when the camera does not face the model, automatically reorienting, at both positions, the camera to the model at a distance from a surface of the model.

* * * * *

UNITED STATES PATENT AND TRADEMARK OFFICE
CERTIFICATE OF CORRECTION

PATENT NO. : 7,042,449 B2
APPLICATION NO. : 10/183432
DATED : May 9, 2006
INVENTOR(S) : Azam Khan It is certified that error appears in the above-identified patent and that said Letters Patent is hereby corrected as shown below:

Title Page Column 2 Item (56) (Other Publications), Line 1, after "et al." insert --,--.

Column 1, Line 45, change "(e.g" to --(e.g.--.

Column 10, Line 55, change "FIG. 315," to --FIG.31--.

Signed and Sealed this

Fourteenth Day of November, 2006

JON W. DUDAS
*Director of the United States Patent and Trademark Office*